(12) United States Patent
Yamada et al.

(10) Patent No.: US 8,094,532 B2
(45) Date of Patent: Jan. 10, 2012

(54) INTERLAYER MOVEMENT APPARATUS, AND INTEGRATED CIRCUIT FOR INTERLAYER MOVEMENT APPARATUS

(75) Inventors: Shin-ichi Yamada, Osaka (JP); Masaya Kuwahara, Hyogo (JP); Yu Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/810,970

(22) PCT Filed: Dec. 25, 2008

(86) PCT No.: PCT/JP2008/003963
§ 371 (c)(1),
(2), (4) Date: Jun. 28, 2010

(87) PCT Pub. No.: WO2009/084204
PCT Pub. Date: Jul. 9, 2009

(65) Prior Publication Data
US 2010/0284258 A1    Nov. 11, 2010

(30) Foreign Application Priority Data
Dec. 28, 2007   (JP) .................................. 2007-339997

(51) Int. Cl.
*G11B 7/00* (2006.01)
(52) U.S. Cl. ............... 369/53.28; 369/44.25; 369/44.28; 369/44.23; 369/112.23
(58) Field of Classification Search .................. None
See application file for complete search history.

(56) References Cited

U.S. PATENT DOCUMENTS

| 5,903,530 | A | 5/1999 | Tateishi |
| 6,061,310 | A | 5/2000 | Iida |
| 7,848,190 | B2 * | 12/2010 | Tada et al. .................. 369/44.35 |
| 2002/0027842 | A1 | 3/2002 | Komma et al. |

(Continued)

FOREIGN PATENT DOCUMENTS

JP   10-143872   5/1998

(Continued)

OTHER PUBLICATIONS

International Search Report issued Mar. 3, 2009 in corresponding International Application No. PCT/JP2008/003963.

(Continued)

*Primary Examiner* — Muhammad N Edun
(74) *Attorney, Agent, or Firm* — Wenderoth, Lind & Ponack, L.L.P.

(57) ABSTRACT

In an interlayer movement apparatus for moving the focal point of the laser light to an arbitrary layer, there are provided an objective lens which collects the laser light from an optical source, a focus actuator which makes the objective lens move in its optical axis direction, a focus error detection means for detecting the convergent state of the laser light on the information layer of the optical disc, and an interlayer movement control system for making the focal point of the laser light move to an information layer two or more layers apart by controlling the focus actuator according to a relative speed between the information layer of the optical disc and the focal point which was calculated using the time required for the focal point of the laser light passing through the respective layers which was measured on the basis of the output signal of the focus error detection means and the respective interlayer distances which are specified by the optical disc specifications.

33 Claims, 14 Drawing Sheets

U.S. PATENT DOCUMENTS

| | | |
|---|---|---|
| 2003/0007431 A1 | 1/2003 | Tateishi |
| 2004/0264311 A1 | 12/2004 | Komma et al. |
| 2004/0264312 A1 | 12/2004 | Komma et al. |
| 2005/0237873 A1 | 10/2005 | Maruyama et al. |
| 2006/0158993 A1 | 7/2006 | Komma et al. |
| 2006/0158994 A1 | 7/2006 | Komma et al. |
| 2006/0181985 A1 | 8/2006 | Komma et al. |
| 2007/0070850 A1 | 3/2007 | Watanabe et al. |
| 2007/0171781 A1 | 7/2007 | Imai et al. |

FOREIGN PATENT DOCUMENTS

| | | |
|---|---|---|
| JP | 2002-157750 | 5/2002 |
| JP | 2003-22545 | 1/2003 |
| JP | 2005-332558 | 12/2005 |
| JP | 2007-122850 | 5/2007 |
| JP | 2007-200447 | 8/2007 |
| JP | 2007-200447 A * | 8/2007 |
| JP | 2007-207359 | 8/2007 |
| JP | 2007-207359 A * | 8/2007 |
| JP | 2007-265578 | 10/2007 |

OTHER PUBLICATIONS

Written Opinion of the International Searching Authority issued Mar. 3, 2009 in corresponding International Application No. PCT/JP2008/003963.

* cited by examiner

Fig.5

| thicness difference(R) | Hn | Bn |
|---|---|---|
| 17um | H1=SFE1/SFE0 | B1=BFE1-BFE0 |
| 38um | H2=SFE2/SFE0 | B2=BFE2-BFE0 |
| 51um | H3=SFE3/SFE0 | B3=BFE3-BFE0 |
| 66um | H4=SFE4/SFE0 | B4=BFE4-BFE0 |
| 76um | H5=SFE5/SFE0 | B5=BFE5-BFE0 |

Fig.6

| thicness difference(R) | Hn | Bn |
|---|---|---|
| 10um | H4=SFE4/SFE5 | B4=BFE4-BFE5 |
| 25um | H3=SFE3/SFE5 | B3=BFE3-BFE5 |
| 38um | H2=SFE2/SFE5 | B2=BFE2-BFE5 |
| 59um | H1=SFE1/SFE5 | B1=BFE1-BFE5 |
| 76um | H0=SFE0/SFE5 | B0=BFE0-BFE5 |

| position information P | layer number | cover layer thickness Dp |
|---|---|---|
| 0 | L0 | 116um |
| 1 | L1 | 99um |
| 2 | L2 | 78um |
| 3 | L3 | 65um |
| 4 | L4 | 50um |
| 5 | L5 | 40um |

| interlayer | interlayer distance | acceleration pulse height Ju | deceleration pulse height Jd |
|---|---|---|---|
| L0 and L1 | 17um | Jus17 | Jds17 |
| L1 and L2 | 21um | Jus21 | Jds21 |
| L2 and L3 | 13um | Jus13 | Jds13 |
| L3 and L4 | 15um | Jus15 | Jds15 |
| L4 and L5 | 10um | Jus10 | Jds10 |

| n | inter layer distance Qn | acceleration pulse height | deceleration pulse height |
|---|---|---|---|
| 0 | 17um | U17 | D17 |
| 1 | 21um | U21 | D21 |
| 2 | 13um | U13 | D13 |
| 3 | 15um | U15 | D15 |
| 4 | 10um | U10 | D10 |

INTERLAYER MOVEMENT APPARATUS, AND INTEGRATED CIRCUIT FOR INTERLAYER MOVEMENT APPARATUS

TECHNICAL FIELD

The present invention relates to a technical field of an optical disc apparatus for recording information onto a multilayer optical disc or reproducing information recorded therein, and more particularly, an interlayer movement apparatus for moving the information recording/reproduction position by an optical head over a plurality of information layers, and an integrated circuit for an interlayer movement apparatus.

BACKGROUND ART

Conventionally, a technical development for enabling increasing the recording capacity of a piece of an optical disc has been carried out. As one among those, which is a technique of doubling the recording capacity per an optical disc, a double-layer disc that has multiplied two recording layers has been realized.

The interlayer movement is performed by after making the focus control once opened, applying to a focus actuator such an acceleration pulse that makes the objective lens move toward the object layer, applying a deceleration pulse thereto in the vicinity of the object layer, and again closing the focus control. The width of the deceleration pulse is determined by measuring the time which was required for moving over a predetermined distance from the layer before movement to the vicinity of the object layer. Besides, since the inter-layer distance varies depending on the disc, it is obtained on the basis of the focus error signal which was obtained when the objective lens is previously moved upward and downward (for example, refer to patent reference 1).

By the way, a development of a multi-layer disc having two or more layers has been advancing. For example, it is a multilayer disc of four or six layers.

FIG. 18 shows an example of a four-layer disc. In FIG. 18, a case is shown where the interlayer distances between respective layers are 15 μm and the laser light which is collimated by the objective lens comes in the focused state in L0 layer. In this state, the laser light which is partially reflected at the intermediate L1 layer comes in the focused state in L2 layer, being superposed on the reflected light from the L0 layer. Therefore, the quality of the reproduced signal is deteriorated. Accordingly, a multi-layer optical disc having disc specifications that include different interlayer distances as shown in FIG. 2 is proposed.

In addition, in order to increase the recording capacity per disc, wavelength shortening of a light source and increasing of Numerical Aperture (NA) of an objective lens are attempted. For example, an optical head having a wavelength of 405 nm and an NA of 0.85 is in practical use. Here, when the thickness of a cover layer of the disc is deviated, a spherical aberration occurs, which spherical aberration increases with an increase in Numerical Aperture of the objective lens. Accordingly, since there arises distortion in the focus error signal influenced by the spherical aberration in such a high density disc, the optical head is provided with a correction mechanism for correcting the spherical aberration which should be generated.

By the way, a focus actuator is generally designed in a voice coil type so as to have a high response speed, while the spherical aberration correcting mechanism which employs a liquid crystal or a stepping motor is designed to have a response speed that is about ten times slow with relative to the focus actuator. Accordingly, it is configured such that, when performing an interlayer movement from an information layer to another information layer, the spherical aberration correcting value is switched to the optimum value for the layer of movement destination in the layer of movement source, and thereafter, the focus actuator is driven to make the focal point position of laser light move to the layer of movement destination (for example, refer to patent document 2).

Patent Document 1: Japanese patent published application No. Hei. 10-143872 (page 1, FIG. 1, and the like)

Patent Document 2: Japanese patent published application 2003-22545 (page 1, FIG. 1, and the like)

DISCLOSURE OF THE INVENTION

Problems to be Solved by the Invention

However, if there are an increased number of, for example, four or six information layers in the interlayer movement apparatus for a prior art optical disc apparatus, when the interlayer movement is carried out by repeating a one-layer movement, repeating processing of five times at maximum are required. This should cause such problems that the time required for the interlayer movement would increase, thereby resulting in interruptions in continuous image reproduction.

In addition, in a case where an optical head has a wavelength of 405 nm and a numerical aperture of 0.85, it is required to perform corrections of distortions of the focus error signal due to deviations in such as optical detectors that occur due to temperature and aging, and of distortions influenced by the spherical aberration, separately from each other.

The present invention is directed to solving the above-described problems and has for its object to provide an interlayer movement apparatus which can realize a stable interlayer movement even when reproducing a multi-layer disc using an objective lens having a high numerical aperture, and an integrated circuit of such an interlayer movement apparatus.

Measures to Solve the Problems

According to a first aspect of the present invention, there is provided an interlayer movement apparatus for moving a focal point of an optical beam between layers of an optical disc in an optical disc apparatus which performs recording and reproduction of data with irradiating a laser light onto an optical disc which has a plurality of layers and have interlayer distances between the respective information layers which are different according to the optical disc specifications, comprising: an objective lens which collects the laser light from an optical source; a focus actuator for moving the objective lens in its optical axis direction; a focus error detection means for detecting the convergent state of the laser light on the information layer of the optical disc; and an interlayer movement control system operated to drive said focus actuator according to a relative speed between the information layer of the optical disc and the focal point which was calculated using the respective interlayer distances which are specified by the optical disc specification and the time required for the focal point of the laser light passing through the respective layers which was measured on the basis of the output signal of the focus error detection means, thereby to make the focal point of the laser light move to an information layer two or more layers apart.

Thereby, since it is possible to detect the relative speed at high precision, the speed control when making the focal point of the laser light move can be carried out at high precision, thereby enabling a stable interlayer movement of the laser light.

According to a second aspect of the present invention, there is provided an interlayer movement apparatus for moving the focal point of a laser light between layers of an optical disc in an optical disc apparatus which performs recording and reproduction of data with irradiating a laser light onto an optical disc which has a plurality of information layers with inter-layer distances between the respective information layers that are different due to the optical disc specifications, comprising: an objective lens which collects the laser light from an optical source; a focus actuator for moving the objective lens in its optical axis direction; a focus error detection means for detecting a focus error signal which indicates a convergent state of the laser light on the information layer of the optical disc; a focus control system for controlling the focus actuator so that the laser light on a predetermined information layer of the optical disc comes into a predetermined convergent state; and an interlayer movement control system operated to drive said focus actuator according to a relative speed between the information layer of the optical disc and the focal point which was calculated using the respective interlayer distances which are specified by the optical disc specifications and the time required for the focal point of the laser light passing through the respective layers which was measured on the basis of the focus error signal, thereby to perform one or both of a first interlayer movement that makes the focal point of the laser light interlayer-move to the information layer that is by two or more layers apart and a second interlayer movement that makes the focal point of the laser light interlayer-move to the adjacent layer, thereby to make the focal point of the laser light move to the objective information layer.

Thereby, it is possible to make the focal point of the laser light inter-layer move to an objective layer in a short time.

According to a third aspect of the present invention, there is provided an interlayer movement apparatus as defined in the second aspect, wherein said interlayer movement control system is one which, when moving the focal point of said laser light to the information layer of said optical disc that is most apart from said objective lens, after moving the focal point of said laser light to an information layer that is one prior to the objective information layer by said first interlayer movement, to once close the focus control by the focus control system, and thereafter, to make the focal point of the laser light move to the objective information layer.

Thereby, the frequency that the objective lens and the disc collide with each other can be reduced.

According to a fourth aspect of the present invention, there is provided an interlayer movement apparatus for moving the focal point of the laser light to an arbitrary layer of the optical disc in an optical disc apparatus which performs recording and reproduction of data with irradiating a laser light onto an optical disc which has a plurality of information layers, comprising: an objective lens which collects the laser light from an optical source; a spherical aberration varying means, provided on an optical path between the light source and the objective lens, for correcting the spherical aberration which occurs from said optical disc by varying the position where said means itself is located; a focus actuator for moving the objective lens in its optical axis direction; a focus error detection means for detecting a focus error signal which indicates a convergent state of the laser light on the information layer of the optical disc; an interlayer movement control system operated to correct the symmetry of the focus error signal which was detected by the focus error detection means on the basis of the symmetry of the focus error signal in the predetermined information layer of the optical disc in a predetermined spherical aberration state, and to drive said focus actuator on the basis of the corrected focus error signal, thereby to make the focal point of said laser light move to the other information layer.

Thereby, even when there are distortions in the focus error signal, the asymmetry of the focus error signal due to changes in temperature and with passage of time can be detected, thereby enabling the interlayer movement of laser light stably.

According to a fifth aspect of the present invention, there is provided an interlayer movement apparatus as defined in the fourth aspect, wherein, said interlayer movement control system is operated to previously drive, before performing recording or reproduction of data into/from said optical disc, said focus actuator so as to measure the symmetry of said focus error signal in the respective information layers of said optical disc in a predetermined spherical aberration state, and to correct the symmetry of the focus error signal according to the measured result.

Thereby, even when there are distortions in the focus error signal, the asymmetry of the focus error signal due to changes in temperature and with passage of time can be detected, thereby realizing the interlayer movement of laser light stably.

According to a sixth aspect of the present invention, there is provided an interlayer movement apparatus for moving the focal point of the laser light to an arbitrary layer of the optical disc in an optical disc apparatus which performs recording and reproduction of data with irradiating a laser light onto an optical disc which has a plurality of information layers, comprising: an objective lens which collects the laser light from an optical source; a spherical aberration varying means, provided on an optical path between the light source and the objective lens, for correcting the spherical aberration which occurs from said optical disc by varying the position where said means itself is located; a focus actuator for moving the objective lens in its optical axis direction; a focus error detection means for detecting a focus error signal which indicates a convergent state of the laser light on the information layer of the optical disc; and an interlayer movement control system operated to correct the focus error signal which was detected by the focus error detection means on the basis of the inclination of the focus error signal in the predetermined information layer of said optical disc in a predetermined spherical aberration state, and to drive said focus actuator on the basis of said corrected focus error signal, thereby to make the focal point of the laser light move to the other information layer.

Thereby, since the deviation in the sensitivity of the focus error signal due to the spherical aberration can be corrected, even when the response of the spherical aberration varying element is delayed with relative to the focus actuator, the interlayer movement of the laser light can be carried out stably.

According to a seventh aspect of the present invention, there is provided an interlayer movement apparatus as defined the sixth aspect, wherein said interlayer movement control system is operated to previously drive said focus actuator at a constant speed to measure the inclination of the focus error signal in the respective information layers of the optical disc in a predetermined spherical aberration state, and then to correct the focus error signal according to the measured inclination.

Thereby, since the deviation in the sensitivity of the focus error signal due to the spherical aberration can be corrected, even when the response of the spherical aberration varying element is delayed with relative to the focus actuator, the interlayer movement of the laser light can be carried out stably.

According to an eighth aspect of the present invention, there is provided an interlayer movement apparatus for moving the focal point of the laser light to an arbitrary layer of the optical disc in an optical disc apparatus which performs recording and reproduction of data with irradiating a laser light onto an optical disc which has a plurality of information layers, comprising: an objective lens which collects the laser light from an optical source; a spherical aberration correcting means for correcting a spherical aberration which is occurred from said optical disc by being provided on an optical path between the light source and the objective lens and making its position varied; a focus actuator for moving the objective lens in its optical axis direction; a focus error detection means for detecting a focus error signal which indicates a convergent state of the laser light on the information layer of the optical disc; and an interlayer movement control system operated to correct the focus error signal which was detected by the focus error detection means on the basis of the amplitude of the focus error signal in the predetermined information layer of said optical disc in a predetermined spherical aberration state, and to drive said focus actuator on the basis of said corrected focus error signal, thereby to make the focal point of said laser light move to the other information layer.

Thereby, since the amplitude variation of the focus error signal due to the spherical aberration can be corrected, even when the response of the spherical aberration varying element is delayed with relative to the focus actuator, the interlayer movement of the laser light can be carried out stably.

According to a ninth aspect of the present invention, there is provided an interlayer movement apparatus as defined in the eighth aspect, wherein said interlayer movement control system is operated to previously drive said focus actuator at a constant speed to measure the amplitude of the focus error signal in the respective information layers of said optical disc in a predetermined spherical aberration state, and then to correct the focus error signal according to the measured amplitude.

Thereby, since the amplitude variation of the focus error signal due to the spherical aberration can be corrected, even when the response of the spherical aberration varying element is delayed with relative to the focus actuator, the interlayer movement of the laser light can be carried out stably.

According to a tenth aspect of the present invention, there is provided an interlayer movement apparatus for moving the focal point of the laser light to an arbitrary layer of the optical disc in an optical disc apparatus which performs recording and reproduction of data with irradiating a laser light onto an optical disc which has a plurality of information layers, comprising: an objective lens which collects the laser light from an optical source; a spherical aberration varying means, provided on an optical path between the light source and the objective lens, for correcting a spherical aberration which occurs from said optical disc by varying the position where said spherical aberration varying means itself is located; a focus actuator for moving the objective lens in its optical axis direction; a focus error detection means for detecting a focus error signal which indicates a convergent state of the laser light on the information layer of the optical disc; and an interlayer movement control system operated to correct the focus error signal which was detected by the focus error detection means on the basis of the asymmetry of the focus error signal in the predetermined information layer of said optical disc in a predetermined spherical aberration state, and to drive said focus actuator on the basis of said corrected focus error signal, thereby to make the focal point of said laser light move to the other information layer.

Thereby, since the asymmetry of the focus error signal due to the spherical aberration can be corrected, even when the response of the spherical aberration varying element is delayed with relative to the focus actuator, the interlayer movement of the laser light can be carried out stably.

According to an eleventh aspect of the present invention, there is provided an interlayer movement apparatus as defined in the tenth aspect, wherein said interlayer movement control system is operated to previously drive said focus actuator at a constant speed to measure the asymmetry of the focus error signal in the respective information layers of said optical disc in a predetermined spherical aberration state, and then to correct the focus error signal according to the measured asymmetry.

Thereby, since the asymmetry of the focus error signal due to the spherical aberration can be corrected, even when the response of the spherical aberration varying element is delayed with relative to the focus actuator, the interlayer movement of the laser light can be carried out stably.

According to a twelfth aspect of the present invention, there is provided an interlayer movement apparatus as defined in the sixth aspect, wherein said interlayer movement control system is operated to previously obtain the relation of the inclination of the focus error signal with the difference between the variation amount of the spherical aberration varying means and the focal point position of the laser light, and to correct the inclination of the focus error signal on the basis of the above-described relation while performing an interlayer movement of the laser light.

Thereby, since the deviation in the sensitivity of the focus error signal due to the spherical aberration can be corrected in the interlayer movement between any layers, even when the response of the spherical aberration varying element is delayed with relative to the focus actuator, the interlayer movement of the laser light can be carried out stably.

According to a thirteenth aspect of the present invention, there is provided an interlayer movement apparatus as defined in the eighth aspect, wherein said interlayer movement control system is operated to previously obtain the relation of the amplitude of the focus error signal with the difference between the variation amount of the spherical aberration varying means and the focal point of the laser light, and to correct the amplitude of the focus error signal on the basis of the above-described relation while performing an interlayer movement of the laser light.

Thereby, since the amplitude variation of the focus error signal due to the spherical aberration can be corrected in the interlayer movement between any layers, even when the response of the spherical aberration varying element is delayed with relative to the focus actuator, the interlayer movement of the laser light can be carried out stably.

According to a fourteenth aspect of the present invention, there is provided an interlayer movement apparatus as defined in the tenth aspect, wherein said interlayer movement control system is operated to previously obtain the relation of the asymmetry of said focus error signal with the difference between the variation amount of said spherical aberration varying means and the focal point position of the laser light, and to correct the symmetry of the focus error signal on the basis of the above-described relation while performing an interlayer movement of the laser light.

Thereby, since the asymmetry of the focus error signal due to the spherical aberration can be corrected in the interlayer movement between any layers, even when the response of the spherical aberration varying element is delayed with relative to the focus actuator, the interlayer movement of the laser light can be carried out stably.

According to a fifteenth aspect of the present invention, there is provided an interlayer movement apparatus as defined in any of the sixth to eleventh aspects, which apparatus is operated: after the focal point of the laser light is moved to the objective layer, to start the reproduction of information before the spherical aberration is stabilized to the spherical aberration correction value which corresponds to a value for the objective information layer.

Thereby, the data transfer rate while reproducing the information can be enhanced.

According to a sixteenth aspect of the present invention, there is provided an interlayer movement apparatus as defined in any of the sixth to eleventh aspects, which apparatus is operated to: after the focal point of the laser light is moved to the objective layer, to start the reproduction of information before the spherical aberration is stabilized to a spherical aberration correction value which corresponds to a value for the objective information layer, and to start the recording of information after the spherical aberration is stabilized to said spherical aberration correction value.

Thereby, it is possible to carry out recording of data with enhancing the data transfer rate while reproducing the information.

According to a seventeenth aspect of the present invention, there is provided an interlayer movement apparatus for moving the focal point of a laser light to an arbitrary layer of the optical disc in an optical disc apparatus which performs recording and reproduction of data with irradiating a laser light onto an optical disc which has a plurality of layers and has interlayer distances between the respective information layers which are different according to the optical disc specifications, comprising: an objective lens which collects the laser light from an optical source; a focus actuator for moving the objective lens in its optical axis direction; a focus error detection means for detecting the convergent state of laser light on the information layer of the optical disc, a memory means for storing at least one of a pulse generation timing pulse, an acceleration pulse, and a deceleration pulse as pulses for driving said focus actuator which are in accordance with a plurality of interlayer distances which are specified by said optical disc specifications, and an interlayer movement control system operated to control the focus actuator on the basis of at least one of said pulse generating timing pulse, said acceleration pulse, and said deceleration pulse which are selected according to the interlayer distances which are based on the disc specifications between the information layer of movement source for the focal point of laser light and the information layer of movement destination for the focal point of laser light thereby to make the focal point of laser light move to the information layer of destination.

Thereby, even when the interlayer distances between the layers are different, the interlayer movement of the laser light can be carried out stably.

According to an eighteenth aspect of the present invention, there is provided an integrated circuit for an interlayer movement apparatus which, provided on an optical disc device comprising an objective lens for collecting a laser light from a light source onto an information layer of the optical disc, a focus actuator for moving said objective lens in its optical axis direction, and a focus error detection means for detecting the convergent state of laser light on said information layer, and moves the focal point of laser light between layers of an optical disc which has a plurality of information layers and has interlayer distances between the respective information layers which are different according to the optical disc specifications, which apparatus is operated: to drive said focus actuator according to the relative speed between the information layer of said optical disc and the focal point, which was calculated using the time required for the focal point of laser light passing through the respective layers which was measured based on the output signal of the focus error detection means, and the respective interlayer distances which are specified in said optical disc specifications, thereby to make the focal point of laser light move to the information layer which was apart by two or more layers.

Thereby, since it is possible to detect the relative speed at high precision, the speed control of the laser light while making the focal point of laser light move can be carried out at high precision, thereby enabling to carry out the interlayer movement of laser light stably.

According to a nineteenth aspect of the present invention, there is provided an integrated circuit for an interlayer movement apparatus which, provided on an optical disc apparatus comprising an objective lens for collecting a laser light from a light source onto an information layer of an optical disc, a focus actuator for moving said objective lens in its optical axis direction, and a focus error detection means for detecting a focus error signal indicating the convergent state of laser light on said information layer of the optical disc, and a focus control system for controlling the focus actuator so that the laser light on the predetermined information layer of the optical disc come into a predetermined convergent state, makes the focal point of laser light move between layers of the optical disc which has a plurality of information layers and has interlayer distances between the respective information layers which are different according to the optical disc specifications, which apparatus is operated: to drive said focus actuator according to the relative speed between the information layer of said optical disc and the focal point which was calculated using the time that is required for the focal point of laser light passing through respective layers which was measured based on the focus error signal and the respective interlayer distances of the optical disc, so as to perform one or both of a first interlayer movement that makes the focal point of laser light perform interlayer movement to the information layer that is by two or more layers apart and a second interlayer movement that makes the focal point of laser light perform interlayer movement to the adjacent layer, thereby to make the focal point of laser light move to the objective information layer.

Thereby, an interlayer movement of the focal point of laser light to an objective layer can be carried out in a short time.

According to a twentieth aspect of the present invention, there is provided an integrated circuit for an interlayer movement apparatus as defined in the nineteenth aspect, wherein the apparatus is operated to, when making the focal point of said laser light move to the information layer of said optical disc that is most apart from said objective lens, to make the focal point of said laser light move to an information layer that is one beforehand to the objective information layer by said first interlayer movement, and then to once close the focus control by the focus control system, and thereafter, to make the focal point of laser light move to the objective information layer by the second interlayer movement.

Thereby, the frequency that the objective lens and the disc collide with each other can be reduced.

According to a twenty-first aspect of the present invention, there is provided an integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration that occurs from the optical disc, a focus actuator for moving said objective lens in its optical axis direction, and a focus error detection means for detecting a focus error signal indicating the convergent state of laser light on said information layer of the optical disc, makes the focal point of laser light move between layers of a multi-layer optical disc which has a plurality of information layers, which apparatus is operated: to correct the focus error signal which was detected by the focus error detection means on the basis of the symmetry of the focus error signal in the predetermined information layer of said optical disc in a predetermined spherical aberration state, and to drive said focus actuator on the basis of the corrected focus error signal to make the focal point of laser light move to the other information layer.

Thereby, even when there are distortions in the focus error signal, the asymmetry of the focus error signal due to changes in temperature and with passage of time can be detected, thereby realizing the interlayer movement of laser light stably.

According to a twenty-second aspect of the present invention, there is provided an integrated circuit for an interlayer movement apparatus as defined in the twenty-first aspect, wherein the apparatus is operated, before performing recording or reproduction of data into/from said optical disc, previously to drive said focus actuator to measure the symmetry of said focus error signal in the respective information layers of said optical disc in a predetermined spherical aberration state, and to correct the symmetry of the focus error signal according to the measured result.

Thereby, even when there are distortions in the focus error signal, the asymmetry of the focus error signal due to changes in temperature and with passage of time can be detected, thereby realizing the interlayer movement of laser light stably.

According to a twenty-third aspect of the present invention, there is provided an integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration which occurs from said optical disc by varying the position where said means itself is located, a focus actuator for moving said objective lens in its optical axis direction, and a focus error detection means for detecting the focus error signal indicating the convergent state of laser light on said information layer of the optical disc, makes the focal point of the laser light move between the layers of a multi-layer optical disc which has a plurality of information layers, which apparatus is operated: to correct the focus error signal which was detected by the focus error detection means on the basis of the inclination of the focus error signal in the predetermined information layer of said optical disc in a predetermined spherical aberration state, and to drive said focus actuator on the basis of said corrected focus error signal, thereby to make the focal point of the laser light move to the other information layer.

Thereby, since the deviation in the sensitivity of the focus error signal due to the spherical aberration can be corrected, even when the response of the spherical aberration varying element is delayed with relative to the focus actuator, the interlayer movement of the laser light can be carried out stably.

According to a twenty-fourth aspect of the present invention, there is provided an integrated circuit for an interlayer movement apparatus as defined in the twenty-third aspect, wherein the apparatus is operated to previously drive said focus actuator at a constant speed to measure the inclination of the focus error signal in the respective information layers of the optical disc in a predetermined spherical aberration state, and then to correct the focus error signal according to the measured inclination.

Thereby, since the deviation in the sensitivity of the focus error signal due to the spherical aberration can be corrected, even when the response of the spherical aberration varying element is delayed with relative to the focus actuator, the interlayer movement of the laser light can be carried out stably.

According to a twenty-fifth aspect of the present invention, there is provided an integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration which occurs from said optical disc by varying the position where said means itself is located; a focus actuator for moving said objective lens in its optical axis direction, and a focus error detection means for detecting the convergent state of laser light on said information layer, makes the focal point of the laser light move between layers of an optical disc which has a plurality of information layers, which apparatus is operated: to correct the symmetry of the focus error signal which was detected by the focus error detection means on the basis of the amplitude of the focus error signal in the predetermined information layer of said optical disc in a predetermined spherical aberration state, and to drive said focus actuator on the basis of said corrected focus error signal, to make the focal point of said laser light move to the other information layer.

Thereby, since the amplitude variation of the focus error signal due to the spherical aberration can be corrected, even when the response of the spherical aberration varying element is delayed with relative to the focus actuator, the interlayer movement of the laser light can be carried out stably.

According to a twenty-sixth aspect of the present invention, there is provided an integrated circuit for an interlayer movement apparatus as defined in the twenty-fifth aspect, wherein the apparatus is operated to previously drive said focus actuator at a constant speed to measure the amplitude of the focus error signal in the respective information layers of said optical disc in a predetermined spherical aberration state, and then to correct the focus error signal according to the measured amplitude.

Thereby, since the amplitude variation of the focus error signal due to the spherical aberration can be corrected, even when the response of the spherical aberration varying element is delayed with relative to the focus actuator, the interlayer movement of the laser light can be carried out stably.

According to a twenty-seventh aspect of the present invention, there is provided an integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration which occurs from said optical disc by varying the position where said means itself is located, a focus actuator for moving said objective lens in the optical axis direction, and a focus error detection means for detecting the convergent state of laser light on said information layer, makes the focal point of the laser light move between layers of an optical disc which has a plurality of information layers, which apparatus is operated: to correct the focus error signal which was detected by the focus error detection means on the basis of the asymmetry of the focus error signal in a predetermined information layer of the optical disc in a predetermined spherical aberration state, and to make the focal point of the laser light move to the other information layer on the basis of the corrected focal error signal.

Thereby, since the asymmetry of the focus error signal due to the spherical aberration can be corrected, even when the response of the spherical aberration varying element is delayed with relative to the operation of the focus actuator, the interlayer movement of the laser light can be carried out stably.

According to a twenty-eighth aspect of the present invention, there is provided an integrated circuit for an interlayer movement apparatus as defined in the twenty-seventh aspect, wherein the apparatus is operated to previously drive said focus actuator at a constant speed to measure the asymmetry of the focus error signal in the respective information layers of said optical disc in a predetermined spherical aberration state, and then to correct the focus error signal according to the measured asymmetry.

Thereby, since the asymmetry of the focus error signal due to the spherical aberration can be corrected, even when the response of the spherical aberration varying element is delayed with relative to the focus actuator, the interlayer movement of the laser light can be carried out stably.

According to a twenty-ninth aspect of the present invention, there is provided an integrated circuit for an interlayer movement apparatus as defined in the twenty-third aspect, wherein the apparatus is operated to previously obtain the relation of the inclination of the focus error signal with the difference between the variation amount of the spherical aberration varying means and the focal point position of the laser light, and to correct the inclination of the focus error signal on the basis of the above-described relation while performing an interlayer movement of the laser light.

Thereby, since the deviation in the sensitivity of the focus error signal due to the spherical aberration can be corrected while performing an interlayer movement between any layers, even when the response of the spherical aberration varying element is delayed with relative to the focus actuator, the interlayer movement of the laser light can be carried out stably.

According to a thirtieth aspect of the present invention, there is provided an integrated circuit for an interlayer movement apparatus as defined in the twenty-fifth aspect, wherein the apparatus is operated to obtain the relation of the amplitude of the focus error signal with the difference between the variation amount of the spherical aberration varying means and the focal point of the laser light, and to correct the amplitude of the focus error signal on the basis of the above-described relation while performing an interlayer movement of the laser light.

Thereby, since the amplitude variation of the focus error signal due to the spherical aberration can be corrected while performing an interlayer movement between any layers, even when the response of the spherical aberration varying element is delayed with relative to the focus actuator, the interlayer movement of the laser light can be carried out stably.

According to a thirty-first aspect of the present invention, there is provided an integrated circuit for an interlayer movement apparatus as defined in the twenty-seventh aspect, wherein the apparatus is operated to previously obtain the relation of the asymmetry of said focus error signal with the difference between the variation amount of said spherical aberration varying means and the focal point position of the laser light, and to correct the symmetry of the focus error signal on the basis of the above-described relation while performing an interlayer movement of the laser light.

Thereby, since the asymmetry of the focus error signal due to the spherical aberration can be corrected while performing an interlayer movement between any layers, even when the response of the spherical aberration varying element is delayed with relative to the focus actuator, the interlayer movement of the laser light can be carried out stably.

According to a thirty-second aspect of the present invention, there is provided an integrated circuit for an interlayer movement apparatus as defined in any of the twenty-third to twenty-eighth aspects, wherein after the focal point of the laser light is moved to the objective layer, the reproduction of information is started before the spherical aberration is stabilized to the spherical aberration correction value which is a value corresponding to the objective information layer.

Thereby, the data transfer rate while reproducing the information can be enhanced.

According to a thirty-third aspect of the present invention, there is provided an integrated circuit for an interlayer movement apparatus which, provided on an optical disc apparatus comprising an objective lens which collects the laser light from an optical source; a focus actuator which moves the objective lens in its optical axis direction; a focus error detection means for detecting the convergent state of laser light on the information layer of the optical disc; and a memory means for storing at least one of a pulse generation timing pulse, an acceleration pulse, and a deceleration pulse as pulses for driving said focus actuator which are in accordance with a plurality of interlayer distances which are specified by said optical disc specifications, makes the focal point of a laser light move to an arbitrary layer of the optical disc which has a plurality of layers and has interlayer distances between the respective information layers which are different according to the optical disc specifications, which apparatus is operated: to drive the focus actuator on the basis of at least one of said pulse generating timing pulse, said acceleration pulse, and said deceleration pulse which are selected according to the interlayer distances between the information layer of movement source for the focal point of laser light and the information layer of movement destination for the focal point of laser light, thereby to make the focal point of laser light move to the information layer of movement destination.

Thereby, even when the interlayer distances are different between the respective layers, the interlayer movement of the laser light can be carried out stably.

Effects of the Invention

According to the interlayer movement apparatus of the present invention, since the relative speed between the information layer of the optical disc and the focal point of the present invention is obtained, and the amplitude of the pulse for driving the focus actuator is determined based on the relative speed to make the focal point of the laser light move, even when the interlayer distances between the respective layers are different, the interlayer movement can be carried out stably.

In addition, since the apparatus previously drives the focus actuator to measure the inclination or asymmetry of the focus error signal in the respective information layers in the spherical aberration state of the objective information layer and corrects the focus error signal according to the measured result to carry out the interlayer movement on the basis of the focus error signal after corrected, even when the response of the spherical aberration varying element is delayed with relative to the focus actuator, the interlayer movement of the laser light can be carried out stably.

In addition, by performing correction of the focus error signal, the reduction in the focus error detection sensitivity can be prevented and the symmetry of the focus error signal can be approximately maintained, thereby the control when closing the focus control at the objective information layer can be made stable.

In addition, since after the focal point of the laser light is moved from the L5 layer to the L1 layer by the first interlayer movement which makes the focal point of the laser light move the information layer that is two or more layers apart, once the focus control is closed to make the spherical aberration varying element move to the most appropriate value of the L0 layer in that state, and thereafter, the focal point of the laser light is moved to the L0 layer by the second interlayer movement which make the focal point of the laser light move to the adjacent layer, the focus pulling at the L0 layer can be carried out stably, and the interlayer movement of the laser light can be carried out stably.

BRIEF DESCRIPTION OF THE DRAWINGS

FIG. 5 is a diagram illustrating the deteriorations of the FE detection sensitivity against the thickness difference of the cover layer (when it is thin) and the deterioration of the symmetry in the first embodiment of the present invention.

FIG. 6 is a diagram illustrating the deteriorations of the FE detection sensitivity against the thickness difference of the cover layer (when it is thick) and the deterioration of the symmetry in the first embodiment of the present invention.

Figure 1:
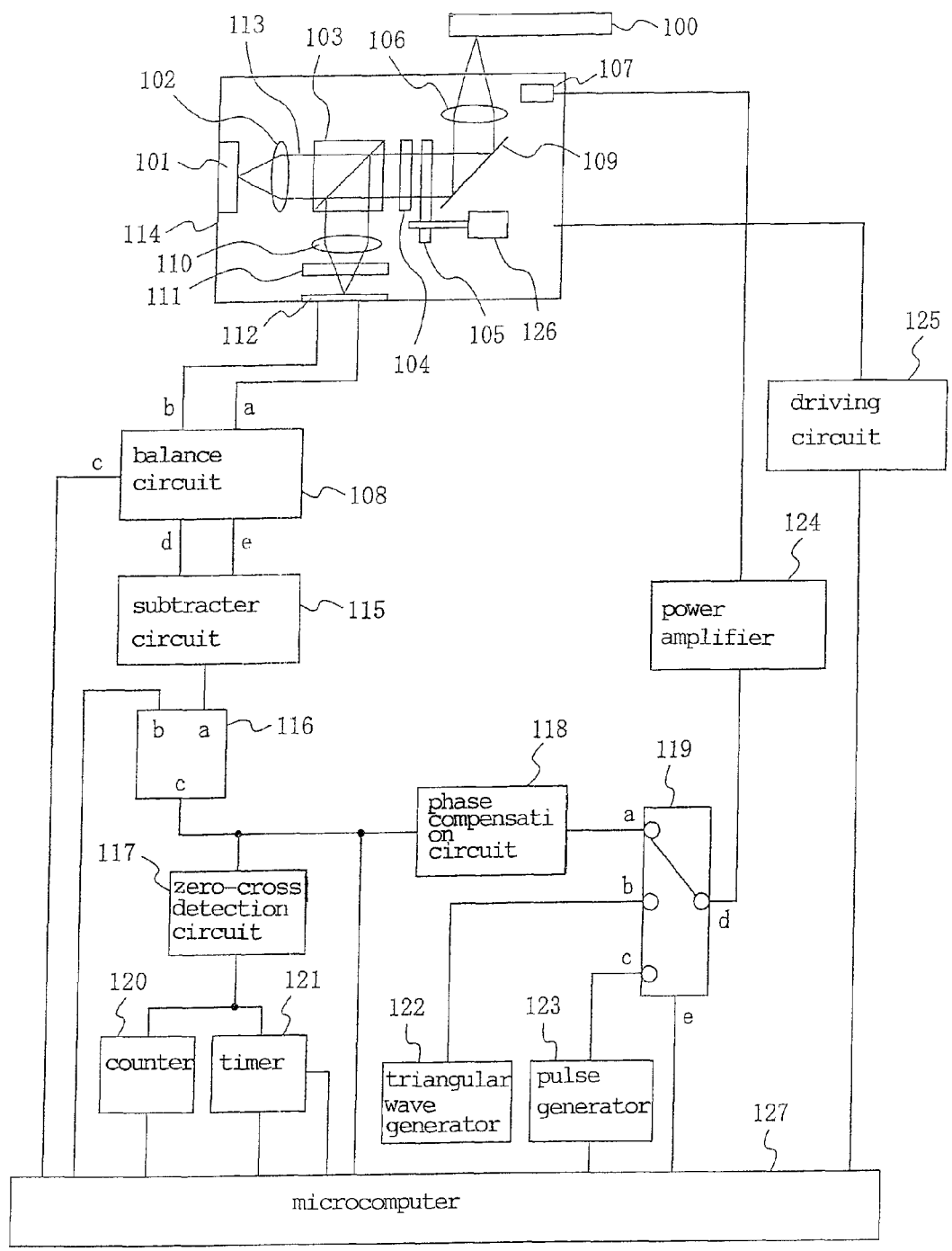
FIG. 1 is a block diagram illustrating an interlayer movement apparatus according to a first embodiment of the present invention.

DESCRIPTION OF REFERENCE NUMERALS 100 optical disc
101 laser
102 coupling lens
103 deflection beam splitter
104 ¼ deflection beam splitter
105 spherical aberration varying element
106 objective lens
107 focus actuator
108 balance circuit
109 total reflection mirror
110 detection lens
111 cylindrical lens
112 photo detector
113 optical beam
114 optical head
115 subtracter circuit
116 multiplier circuit
117 zero-cross detection circuit
118 phase compensation circuit
119 switch
120 counter
121 timer
122 triangular wave generator
123 pulse generator
124 power amplifier
125 driving circuit
126 stepping motor
127 microcomputer

DETAILED DESCRIPTION OF THE INVENTION

First Embodiment

Hereinafter, an interlayer movement apparatus according to a first embodiment of the present invention will be described with reference to FIG. 1.

In FIG. 1, an optical disc 100 is attached on a motor (not shown) to rotate at a predetermined rotation number. The optical disc 100 has tracks which are formed concavo-convex in a spiral shape on its information surface.

The optical head 114 is provided with a laser 101, a coupling lens 102, a deflection beam splitter 103, a ¼ wavelength plate 104, a spherical aberration varying element 105, a total reflection mirror, 109, a photo detector 112, a detection lens 110, a cylindrical lens 111, a focus actuator 107, a tracking actuator (not shown), and an objective lens 106.

The laser light 113 which was emitted from the laser 101 is made into parallel beams by the coupling lens 102, and thereafter, they pass through the deflection beam splitter 103, the ¼ wavelength plate 104, and the spherical aberration varying element 105, are reflected by the total reflection mirror 109, and are converged by the objective lens 106 to be irradiated onto the information surface of the optical disc 100.

The reflected light that is reflected by the optical disc 100 is reflected by the total reflection mirror 109 after passing through the objective lens 106, and passes through the spherical aberration varying element 105, the ¼ wavelength plate 104, the deflection beam splitter 103, the detection lens 110, and the cylindrical lens 111 to be incident to the photo detector 112.

The focus actuator 107 comprises a focus coil and a permanent magnet for focusing. In addition, an objective lens 106 is provided at a movable part of the focus actuator 107. When a voltage is applied to the focus coil of the focus actuator 107 using a power amplifier 124, a current flows through the coil, and the coil is affected on by a magnetic force from the focusing permanent magnet, and thereby the objective lens 106 is moved in a direction vertical to the information surface of the optical disc 100 (up and downward direction in the figure).

The light reflected from the optical disc 100 which is incident to the photo detector 112 is sent out to the subtracter 115 via the balance circuit 108. The subtracter 115 generates a focus error signal showing the deviation between the focal point of the laser light 113 and the information layer of the optical disc 100. The balance circuit 108 varies the symmetry of the FE signal dependent on the value which is set at terminal c. The optical system shown in FIG. 1 configures an FE signal detection system that employs a generally called astigmatic method. The FE signal which was outputted from the subtracter 115 is sent out to the power amplifier 124 through the multiplier 116, the phase compensation circuit 118, and the switch 119.

The phase compensation circuit 118 is a filter which advances the phase for stabilizing the focus control system. The power amplifier 124 supplies a current to the focus coil of the focus actuator 107. The objective lens 106 is driven according to the FE signal by the phase compensation circuit 118 and the power amplifier 124 so that the focal point of the laser light 113 is controlled to be always positioned on the information surface. Besides, the variation of the level of the FE signal against the deviation between the focal point of the laser light 113 and the information layer of the optical disc 100 is hereinafter called as "FE detection sensitivity". The FE detection sensitivity is reduced when the spherical aberration amount at the focal point of the laser light 113 is increased.

The spherical aberration varying element 105 varies the spherical aberration amount at the focal point of the laser light 113, and it is constituted to displace in the optical axis direction by the stepping motor 126. The stepping motor 126 is connected to the microcomputer 127 by a driving circuit 125.

The triangle wave generator 122 generates a triangle wave and sends it to the terminal b of the switch 119. The pulse generator 123 outputs pulses of wave height and wave width which are instructed by the microcomputer 127 to the terminal c of the switch 119. The microcomputer 127 controls the switching of the switch 117 by varying the set value of the terminal e of the switch 119. The multiplier circuit 116 multiplies the set value from the terminal on the FE signal which is input to the terminal a to output the result to the terminal c. The zero cross detection circuit 117 detects the timing when the FE signal zero crosses and outputs pulses to the counter 120 and the timer 121. The counter 120 counts the pulses which are outputted from the zero cross detection circuit 117 and outputs the result to the microcomputer 127. In addition, the timer 121 measures the time interval between pulses which are outputted from the zero cross detection circuit 117 to send the result to the microcomputer 127.

In the interlayer movement apparatus of this first embodiment constituted as described above, a focus control means for controlling such that the focal point of the laser light being on the information layer of the optical disc 100 is constituted by a focus actuator 107 including the photo detector 112, the balance circuit 108, the subtracter 115, the phase compensation circuit 118, the power amplifier 124, and the focus coil.

An example of an optical disc 100 which is a multi-layer optical disc will be described with reference to FIG. 2.

The optical disc 100 has six information layers each of which is reproducible from one side surface thereof. The laser light is incident from the surface of the cover layer. In the optical disc 100 of FIG. 2, the cast substrate side is made as L0 layer and the cover layer side is made as L5 layer. The respective interlayer distances are set to different values in order to reduce the influences by the multiple reflections.

The laser light 113 is incident from the surface of the optical disc 100. When the information of the L0 layer is reproduced, the focus control is carried out so that the focal point is located on the L0 layer. In addition, the position of the spherical aberration varying element 105 is moved to such a position that the spherical aberration becomes minimum at the L0 layer. Besides, when "116" is set to the driving circuit 125, the position of the spherical aberration varying element 105 is deviated to the optimum position in the cover layer thickness (the thickness from the L0 layer to the surface of the cover layer) of 116 um, i.e., the position at which the spherical aberration becomes minimum at L0 layer. The position of the spherical aberration varying element 105 which makes the spherical aberration minimum within the cover layer thickness 116 um is determined by the optical and mechanical design. In addition, when the information of the L1 layer is reproduced, a focus control is carried out to make the focal point positioned at the L1 layer, and further, the position of the spherical aberration varying element 105 is displaced to a position where the spherical aberration becomes minimum at the L1 layer. In other words, "99" is set to the driving circuit 125.

Next, the waveform of the FE signal and the reflected light amount of the laser light with relative to the focal point of the laser light will be described with reference to FIG. 3.

Figure 3:
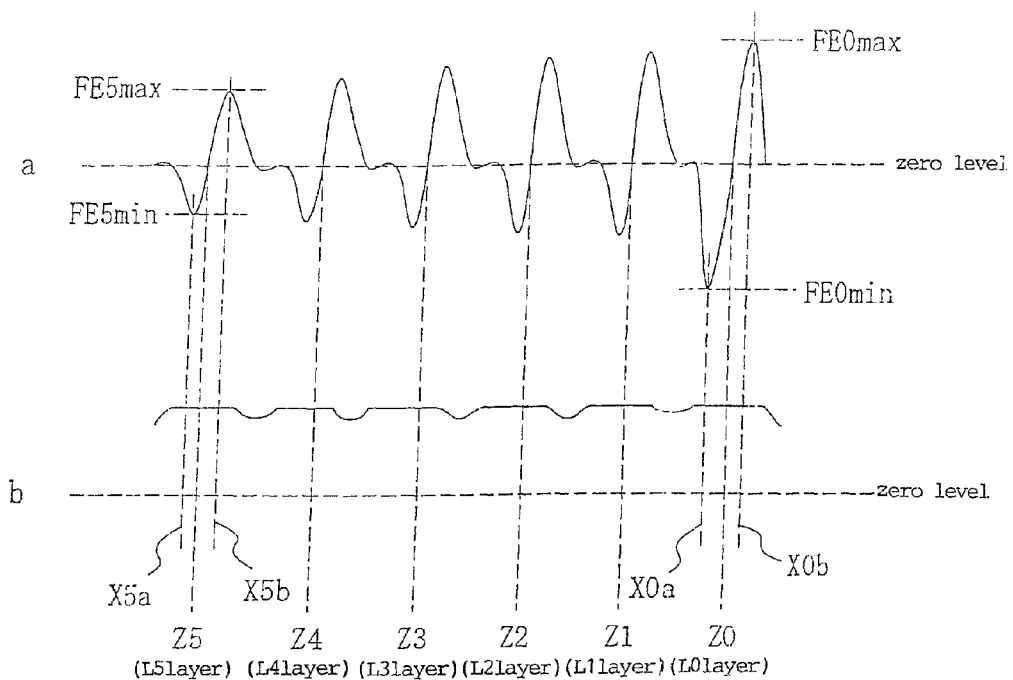
FIG. 3 is a diagram illustrating waveforms showing the FE signal against the focal point position which is obtained when starting the interlayer movement apparatus in the first embodiment of the present invention.

In FIG. 3, the waveform a shows the FE signal relative to the focal point of the laser light 113. The waveform of this FE signal represents the characteristics in a state where the position of the spherical aberration varying element 105 is displaced to a position of L0 layer where the spherical aberration becomes minimum. That is, it is a state where "116" is set to the driving circuit 125. The abscissa represents the focal position and the ordinate represents the level of FE signal.

The waveform b represents the reflection light amount from the disc 100 (hereinafter referred to as "AS signal"). The abscissa represents the focal position and the ordinate represents the level of AS signal.

The FE signal becomes an S-shaped waveform when the focal point passes through the layer, and the position which crosses with the zero level is in-focal point. In FIG. 3, the Z0 to Z5 represent the zero-cross positions, i.e., the positions of L0 layer to L5 layer.

Figure 2:
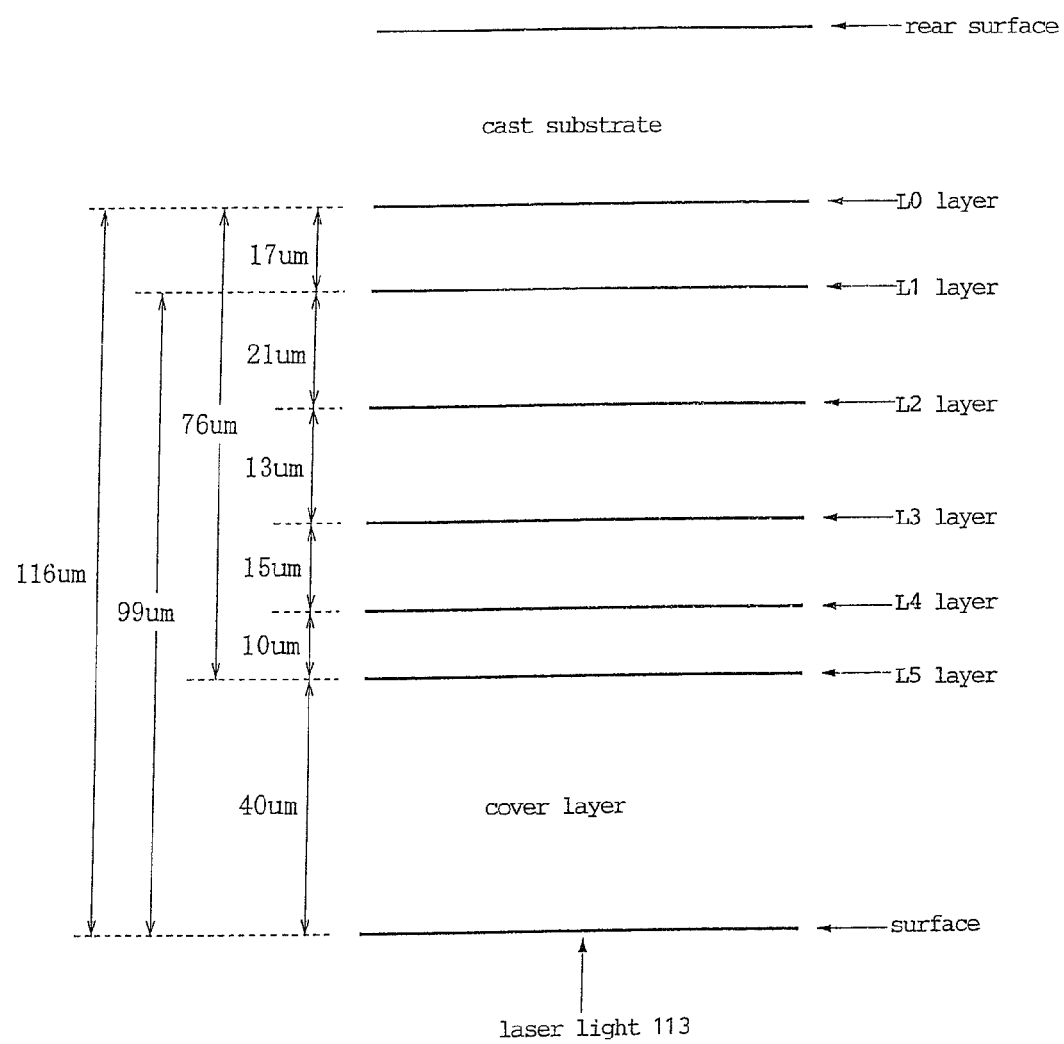
FIG. 2 is a schematic view illustrating a multi-layer optical disc according to a first embodiment of the present invention.

The respective interlayer distances of the disc 100 take values shown in FIG. 2, and the interval between Z0 and Z1 is 17 um, the interval between Z1 to Z2 is 21 um, the interval between Z2 and Z3 is 13 um, the interval between Z3 to Z4 is 15 um, and the interval between Z4 and Z5 is 10 um.

The S-shaped waveform which is generated in the L0 layer is corrected for its spherical aberration by the spherical aberration varying element 105, and therefore, it is in a waveform having no distortion. However, since the S-shaped waveform which is generated in the L5 layer is in a state where the cover layer thickness has become about 76 um, there arises a spherical aberration correspondingly thereto, and there arises a distorted waveform.

Besides, the waveform of the AS signal is not likely to be affected by the influences by the spherical aberration, and the disc is designed such that the reflection rates of the respective layers are approximately equal to each other, that waveform become approximately same level at all the layers as shown by the waveform b shown in FIG. 3.

Figure 4:
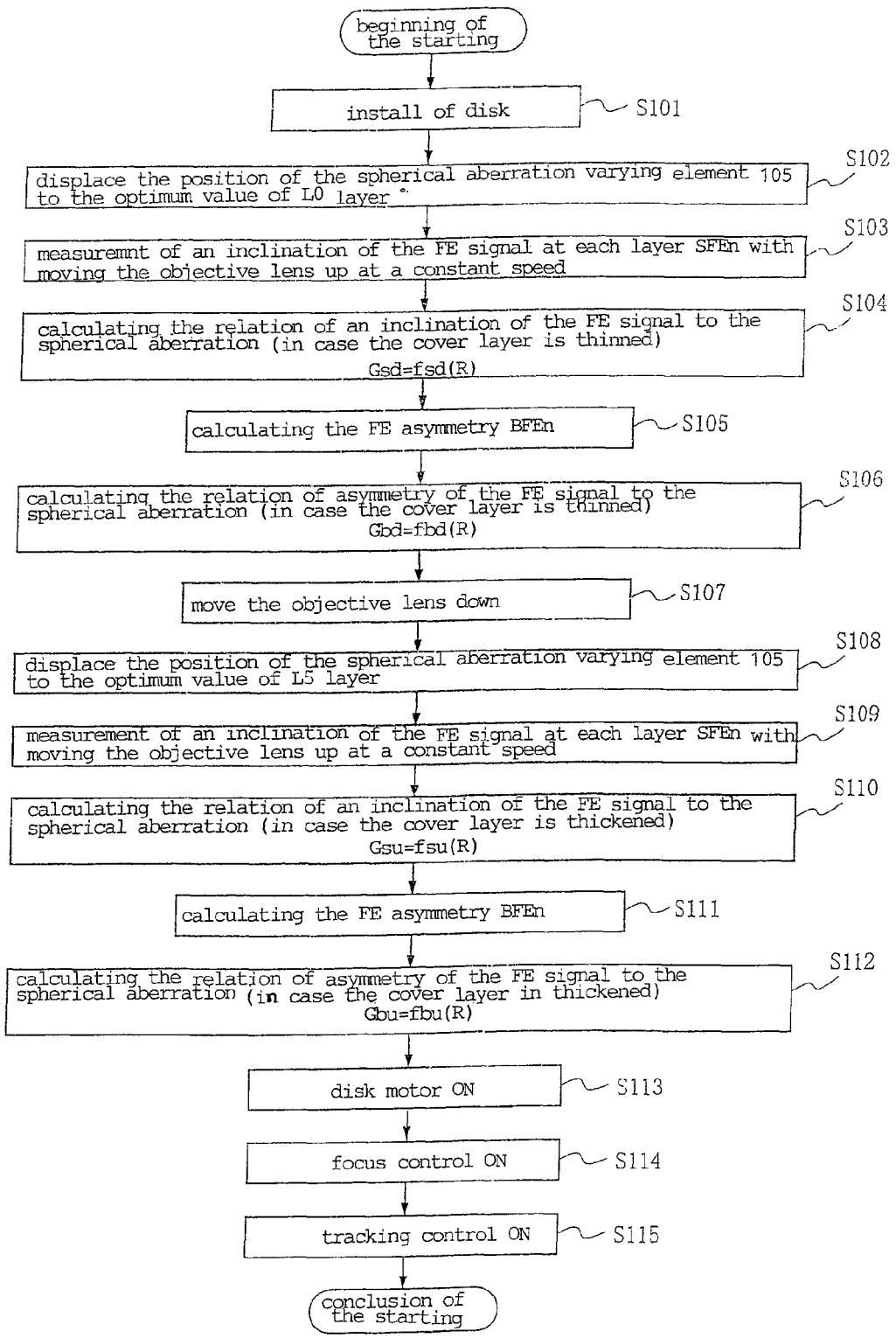
FIG. 4 is a diagram illustrating a flow of processing at starting of the interlayer movement apparatus according to the first embodiment of the present invention.

Next, in the interlayer movement apparatus of the first embodiment, the operation from the optical disc 100 being installed to the reading out of information from the designated information layer being started will be described with reference to the flowchart of FIG. 4.

First of all, in step S101, the optical disc 100 is installed, and a reproduction instruction for a predetermined layer of the disc 100 is issued. In step S102, the microcomputer 127 displaces the position of the spherical aberration varying element 105 so that the spherical aberration at the L0 layer becomes minimum.

In step S103, the switch 119 is switched by a control instruction by the microcomputer 127, and the output of the triangle wave generator 122 is supplied to the power amplifier 124. The power amplifier 124 outputs the output according to the inputted triangle wave to the focus coil of the focus actuator 107, and makes the objective lens 106 move up and downwards in the direction vertical to the information layer of the disc 100, thereby performing a focus search operation.

By this focusing operation, the relative distances between the objective lens 106 and the disc 100 are changed, and the FE signal which has six S-shaped characteristics corresponding to the six information layers at the output side of the subtracter circuit 115 are outputted according to the output of the triangle wave.

In addition, in this step S103, the position of X0a at which the FE signal becomes minimum in the neighbor of the in-focus position of L0 layer, the level FE0min of the FE signal at that timing, the position of X0b at which the FE signal becomes maximum in the neighbor of the in-focus position of L0 layer, and the level FE0max of the FE signal at that timing are stored in the storing means such as RAM of the microcomputer 127. Here, the X0a and X0b can be obtained from the sensitivity of the focus actuator 107 and the set value of the power amplifier 124 since the objective lens 106 is displaced at a constant speed.

As for L1 layer to L5 layer, similar measurements are performed to store the results. As an example, in case of L5 layer, the values of X5a, FE5min, X5b, and FE5max are stored.

Besides, the position of the spherical aberration varying element 105 is set so that the spherical aberration becomes minimum at the L0 layer. That is, it is the position where the spherical aberration becomes minimum in a case where the thickness of the cover layer is 116 um. Accordingly, in a case where an in-focus state is obtained at the L1 layer which is at the position of Z1 in FIG. 3, there arises a spherical aberration which corresponds to 17 um as a thickness of the intermediate layer. Similarly, in a case where an in-focus state is obtained at the L2 layer which is at the position of Z2, there arises a spherical aberration which corresponds to 38 um which is a sum of 17 um and 21 um. It can be similarly considered also for the L3 to L5 layers.

In addition, in step S103, the microcomputer 127 calculates the FE signal detection sensitivity SFE which is an inclination of the FE signal on the basis of following formula 1 from X0a, FE0min, X0b, and FE0max:

$$SFE0 = (FE0\max - FE0\min)/(X0b - X0a) \quad \text{(formula 1)}$$

Similarly, the FE detection sensitivity SFE1 to SFE5 of the L1 to L5 layers are calculated, and the inclination SFEn of the FE signal at respective layers are measured. Further, at step S104, the ratio H1 of SFE1 to SFE0 is calculated by the following formula 2:

$$H1 = SFE1/SFE0 \quad \text{(formula 2)}$$

Similarly, the H2 to H5 are also calculated for L2 to L5 layers, and the value of Hn in the table shown in FIG. 5 are calculated. In FIG. 5, Hn represents H1 to H5. Then, by using such as a least square method, the relation formula of the variation amount of the FE detection sensitivity with relative to the deviation from the cover layer thickness 116 um with making the cover layer thickness of L0 layer as a reference (it is described as thickness difference (R) in the table shown in FIG. 5) is obtained as shown in following formula 3:

$$Gsd = fsd(R) \quad \text{(formula 3)}$$

R represents the thickness difference shown in FIG. 5, and Gsd represents the FE detection sensitivity ratio H at that position. For example, in L1 layer, L=17 um, and Gsd becomes approximately H1. Accordingly, Gsd shows the variation amount of SFE when the cover layer is thinned by R in a case where the SFE in a state where the correction is performed so that the spherical aberration becomes the minimum is 1.

In the next step S105, the microcomputer 127 calculates the FE asymmetry BFE0 indicating asymmetry of the FE signal from the above-described FE0min, and FE0max, on the basis of the following formula 4:

$$BFE0 = (FE0\max + FE0\min)/(FE0\max - FE0\min) \quad \text{(formula 4)}$$

For example, in a case where FE0max=10, and FE0min=−10, BFE0=0, and the FE signal is proven to be completely symmetrical.

Similarly, the FE asymmetry is calculated for each of L1 to L5 layers, and the FE asymmetry BFEn at each layer is measured.

Next, in step S106, the difference between BFE0 and BFE1 is calculated from the following formula 5:

$$B1 = BFE1 - BFE0 \quad \text{(formula 5)}$$

Similarly, B2 to B5 are calculated also for L2 to L5 layers, to produce the table shown in FIG. 5. In FIG. 5, Bn represents B1 to B5. Then, by using such as a least square method, the relation formula of the variation amount of the FE asymmetry with relative to the deviation from the cover layer thickness 116 um with making the cover layer thickness of L0 layer as a reference is obtained as shown in following formula 6:

$$Gbd = fbd(R) \quad \text{(formula 6)}$$

R represents the thickness difference as described above, and Gbd represents the FE asymmetry B at that position.

For example, in L1 layer, L=17 um, and Gbd becomes approximately B1.

Accordingly, Gbd shows the variation amount of BFE when the cover layer is thinned by R in a case where the BFE in a state where the correction is performed so that the spherical aberration becomes the minimum is 0.

In the next step S107, the microcomputer 127 once makes the objective lens 106 apart from the disc 106. In step S108, the microcomputer 127 displaces the position of the spherical aberration varying element 105 so that the spherical aberration at the L5 layer becomes minimum.

In step S109, the microcomputer 127, as similarly in the step S103, makes the objective lens 106 move up and downwards in the direction vertical to the information layer of the disc, thereby performing a focus search operation.

Thereby, the relative distances between the objective lens 106 and the disc 100 are changed, and as shown in FIG. 3, the FE signal which has six S-shaped characteristics corresponding to the six information layers at the output side of the subtracter circuit 115 is outputted according to the output of the triangle wave. However, since the position of the spherical aberration varying element 105 is set to the position at the L5 layer where the spherical aberration becomes minimum, the FE signal amplitude at the L5 layer becomes the maximum, and as it comes close to the L0 layer, the amplitude is reduced, and the distortion is increased Further, in this step S109, the position of X5$a$ at which the FE signal becomes minimum in the neighbor of the in-focus position of L5 layer, the level FE5min of the FE signal at that timing, the position of X5$b$ at which the FE signal becomes maximum in the neighbor of the in-focus position of L5 layer, and the level FE5max of the FE signal at that timing are stored in the storing means such as RAM of the microcomputer 127. Also for the L0 to L4 layers, similar measurements are performed to store the results. As an example, in a case of L0 layer, the values of X0$a$, FE0min, X0$b$, and FE0max are stored.

Besides, the position DL5 of the spherical aberration varying element 105 is set so that the spherical aberration becomes minimum at the L5 layer. That is, it is the position where the spherical aberration becomes minimum in a case where the thickness of the cover layer is 40 um. Accordingly, in a case where an in-focus state is obtained at the L4 layer which is at the position of Z4 in FIG. 3, there arises a spherical aberration which corresponds to 10 um as a thickness of the intermediate layer. Similarly, in a case where an in-focus state is obtained at the L3 layer which is at the position of Z3, there arises a spherical aberration which corresponds to 25 um which is a sum of 10 um and 15 um. It can be similarly considered also for the L0 to L2 layers.

In the next step S110, the microcomputer 127 calculates the FE detection sensitivity SFE which is an inclination of the FE signal from the X5$a$, FE5min, X5$b$, and FE5max, on the basis of the following formula 7:

$$SFE5=(FE5\text{max}-FE5\text{min})/(X5b-X5a) \quad \text{(formula 7)}$$

Similarly, the SFE4 is calculated from the FE detection sensitivity SFE0 to SFE4 for the L0 to L4 layers, and the inclination SFEn of the FE signal at respective layers are measured.

In step S110, the ratio H4 of SFE4 to SFE5 is calculated from the following formula 8:

$$H4=SFE4/SFE5 \quad \text{(formula 8)}$$

Similarly, the H0 to H4 are also calculated for L0 to L4 layers, and the value of Hn in the table shown in FIG. 6 are calculated. Then, by using such as a least square method, the relation formula of the variation amount of the FE detection sensitivity with relative to the deviation from the cover layer thickness 40 um with making the cover layer thickness of L5 layer as a reference (it is described as thickness difference in the table) is obtained as shown in following formula 9

$$Gsu=fsu(R) \quad \text{(formula 9)}$$

R represents the thickness difference shown in FIG. 6, and Gsu represents the FE detection sensitivity ratio H at that position.

For example, in L4 layer, R=10 um, and Gsu becomes approximately H4.

Accordingly, Gsu shows the variation amount of SFE when the cover layer is thickened by L in a case where the SFE in a state where the correction is performed so that the spherical aberration becomes the minimum is 1.

In the next step S111, the microcomputer 127 calculates the FE asymmetry BFE5 indicating asymmetry of the FE signal from the above-described FE5min, and FE5max, on the basis of the following formula 11:

$$BFE5=(FE5\text{max}+FE5\text{min})/(FE5\text{max}-FE5\text{min}) \quad \text{(formula 11)}$$

Similarly, the FE asymmetry BFE0 to BFE4 are calculated for respective L0 to L4 layers, and the FE asymmetry BFEn at each layer is measured.

In step S112, the difference B$ between BFE4 and BFE5 is calculated from the following formula 12:

$$B4=BFE4-BFE5 \quad \text{(formula 12)}$$

Similarly, B0 to B4 are calculated also for L0 to L4 layers, to produce the Bn in the table shown in FIG. 6.

Then, by using such as a least square method, the relation formula of the variation amount of the FE asymmetry with relative to the deviation from the cover layer thickness 40 um with making the cover layer thickness of L5 layer as a reference is obtained as shown in following formula 13:

$$Gbu=fbu(R) \quad \text{(formula 13)}$$

R represents the thickness difference as described above, and Gbu represents the FE asymmetry B at that position.

For example, in L4 layer, R=10 um, and Gbu becomes approximately B4.

Accordingly, Gbu shows the variation amount of BFE when the cover layer is thickened by R in a case where the BFE in a state where the correction is performed so that the spherical aberration becomes the minimum is 0.

In the next step S113, the microcomputer 127 makes the disc 100 rotate, and thereafter, turns on the focus control in step S114, and turns on the tracking control in step S115, thereby the starting of the apparatus is concluded.

Besides, while in the first embodiment, the functions of fsu, fsd, fbu, and fbd are obtained at starting the optical disc device, the respective functions may be previously obtained at fabricating the optical disc device and these are stored in a memory of the optical disc device when the variations with passage of time of the optical head are smaller.

For example, the respective functions may be previously obtained by processing the focus error signal which is measured by using the optical head 114, the power amplifier 124, the driving circuit 125 provided inside the apparatus and the microcomputer that is provided with a program for at the fabrication at the timing of fabrication of the optical disc apparatus, and the parameters of the obtained functions may be stored in a non-volatile memory.

In this case, if the parameters are read out from the non-volatile memory at the starting of the optical disc apparatus to be used, there is no necessity of providing a program for measuring the focus error signal or a program for obtaining parameters of functions in a microcomputer 127 after the fabrication, and further it is possible to shorten the starting time of an apparatus in a case where the optical disc 100 is installed.

In addition, in a case where the optical head 114 has less optical variations, it may be constituted such that parameters of functions are not obtained in all the optical discs, but parameters of functions on the basis of the averages of parameters of functions which are obtained in a predetermined number of optical discs may be stored in an non-volatile memory.

Further, the respective functions are obtained with installing an optical head in a measuring apparatus which is equivalent to having a power amplifier 124, a driving circuit 125 inside the apparatus, and a microcomputer 127 provided with a program for at fabrication, and the obtained parameters of functions may be stored in a non-volatile memory of an optical disc apparatus. In addition, not respective functions are obtained by the actual measurements employing an optical disc apparatus or a measuring apparatus, but parameters of functions which are obtained by analyses such as simulations on the basis of the optical parameters of the optical head may be stored in such as a non-volatile memory.

In addition, while in the above the relational formula of variation of the FE detection sensitivity is obtained for each of a case where the thickness of the cover layer is thin and thick, respectively, by employing the FE signal in the two states, i.e., the state where the position of the spherical aberration varying element 105 is displaced to the optimum value of the L0 layer and the state where that is displaced to the optimum value of the L5 layer, if the FE signal in a state where the position of the spherical aberration varying element 105 is displaced to the optimum value of the L2 layer is employed, the respective relational formula in a case where the thickness of the cover layer is thin and thick, respectively can be obtained from the FE signal in one state.

Next, a description is given of an interlayer movement of the focal point of the laser light which is carried out in a case where the information of the different information layers are reproduced in the interlayer movement apparatus of the first embodiment of the present invention.

Figure 7:
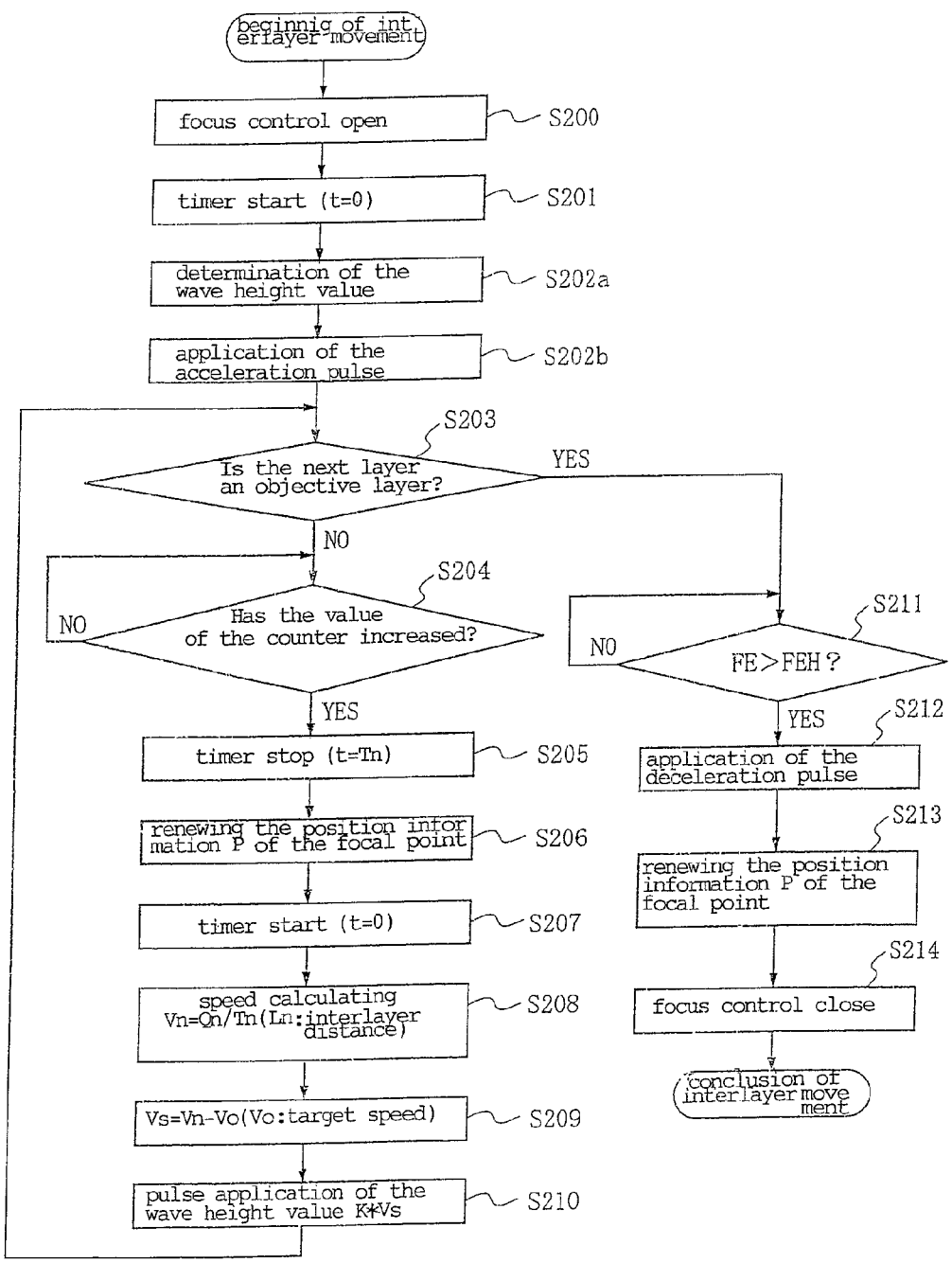
FIG. 7 is a diagram illustrating a flow of interlayer movement according to the first embodiment of the present invention.

First of all, the operation of making the focal point of the laser light move from the L0 layer to the L5 layer is described with reference to the flowchart of FIG. 7.

When the interlayer movement is instructed, in step S200, the microcomputer 127 opens terminal a and terminal d of the switch 119 in FIG. 1 to open the focus control. In the switch 5201, the timer 121 is cleared and the timer 121 is started.

In steps S202a, the wave height values of the acceleration pulse which is at first applied to the focus actuator 107 and the deceleration pulse which is applied just beforehand the objective layer in performing the interlayer movement are respectively determined.

The wave height of the acceleration pulse is determined on the basis of the inter-layer distance between the L0 layer and the L1 layer which is specified by the disc specifications. In addition, the wave height of the deceleration pulse is similarly determined on the basis of the inter-layer distance between the L4 layer and the L5 layer which is specified by the disc specifications.

Figures 16, 17:
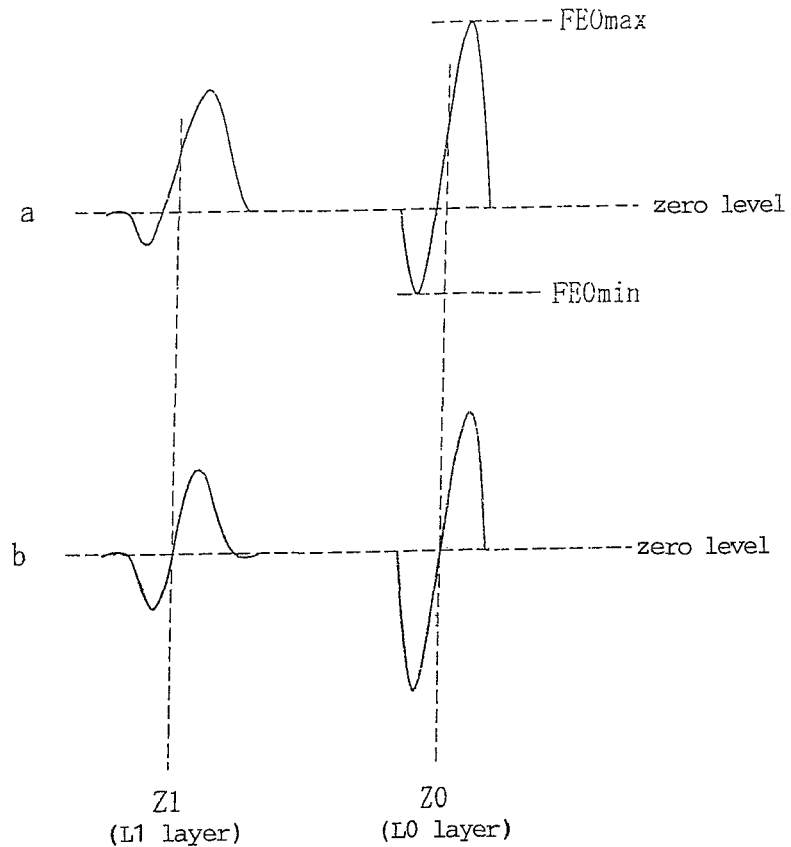
FIG. 16 is a diagram illustrating waveforms of the FE signals in the L0 layer and the L1 layer in the second embodiment of the present invention.
FIG. 17 is a diagram illustrating the crest values of the acceleration pulses and the deceleration pulses in the first interlayer movement in the first embodiment of the present invention.
Figure 18:
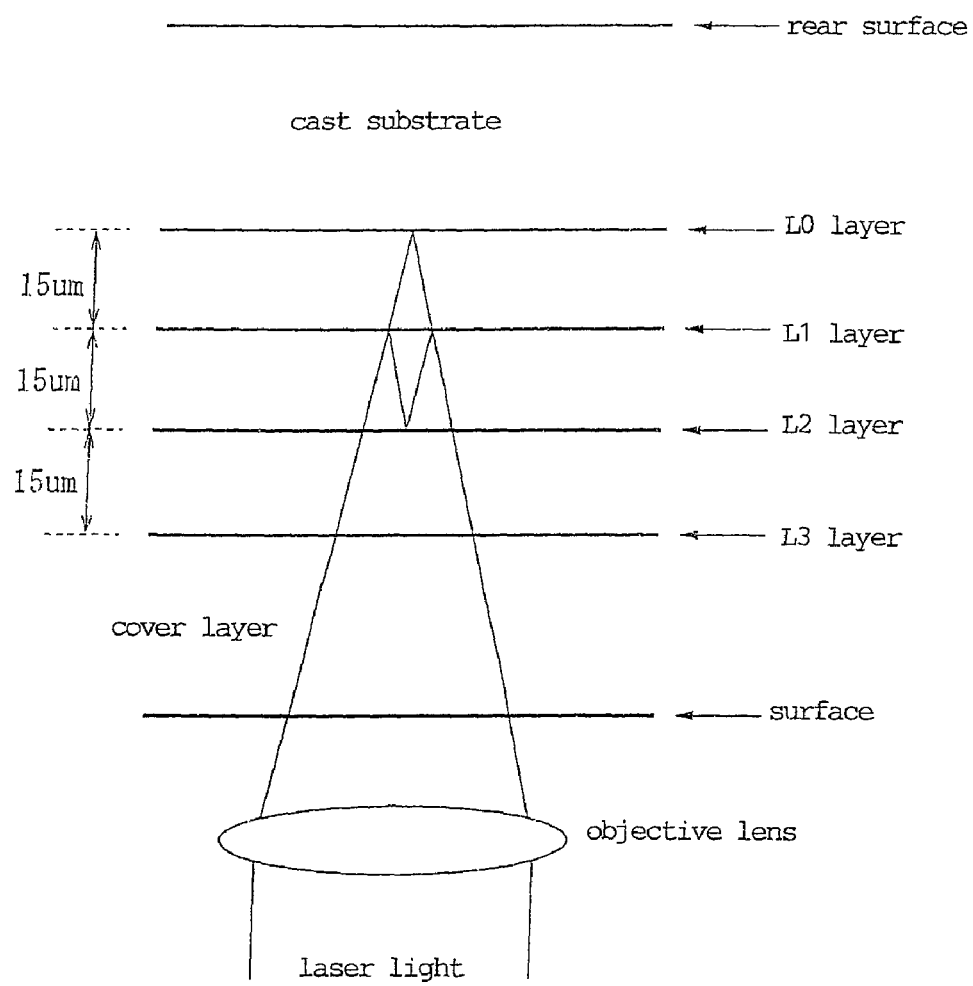
FIG. 18 is a schematic diagram illustrating an example of a prior art multi-layer optical disc.

FIG. 17 is a table showing a relation between the acceleration pulse height and the deceleration pulse height against the inter-layer distance which is specified by the disc specifications. The respective values in the table of FIG. 17 are optimum acceleration pulse height values and deceleration pulse height values for the respective inter-layer distances which are obtained by such as experiments. The interlayer movement apparatus of this first embodiment stores the table in a memory not shown.

Next, in step S202b, the microcomputer 127 connects terminal c and terminal d of the switch 119 to give an instruction to the pulse generation circuit 123 so as to make it generate an acceleration pulse which makes the focal point move toward the L1 layer.

In step S203, it is judged as to whether the next layer is an objective layer or not. That is, the value of the counter 120 is read out and thereby it is judged as to whether the focal point has passed through the L4 layer. If the answer is negative, it is judged as to whether the value of the counter 120 has increased or not in step S204, and it is waited for that the focal point moves to the next layer.

When the focal point has moved to the next layer, it proceeds to step S205, and the timer 121 is stopped at step S205, and the value of the timer 121 is taken in. Then, the position information P of the focal point which indicates in any layer the focal point is present is renewed, and the counting by the timer 121 is restarted.

In step S208, the relative speed Vn between the information surface of the disc 100 and the focal point is calculated on the basis of the timer value Tn and the inter-layer distance Qn. As the inter-layer distance, the values which are specified by the disc specifications are used.

In the step S209, the difference Vs between the target speed V0 of the speed control and the relative speed Vn which was obtained in step S208 is obtained.

In step S210, a predetermined coefficient K is multiplied on the difference Vs to obtain the pulse wave height, and a pulse of a predetermined pulse amplitude is generated from the pulse generation circuit 123 to be applied to the focus actuator through the power amplifier 124 to drive same, and it returns to step S203.

Thereafter, a loop from step S203 to step S210 is repeated until the focal point reaches the L4 layer, and when it is judged that the next layer is L5 layer as an objective layer, it proceeds to step S211.

In step S211, the microcomputer 127 judges as to whether the level of the FE signal is larger than a predetermined level FEH, the timing when it becomes FE>FEH is detected. When it is judged as FE>FEH in step S211, it proceeds to step S212, where a deceleration pulse is outputted.

Then, in step S213, the position information P of the focal point is renewed to the objective layer, the microcomputer 127 connects terminal a and terminal d of the switch 119 to close the focus control, thereby to conclude the interlayer movement.

The above-described interlayer movement from the L0 layer to the L5 layer will be described with reference to the waveform diagram shown in FIG. 8.

Figures 8, 9:
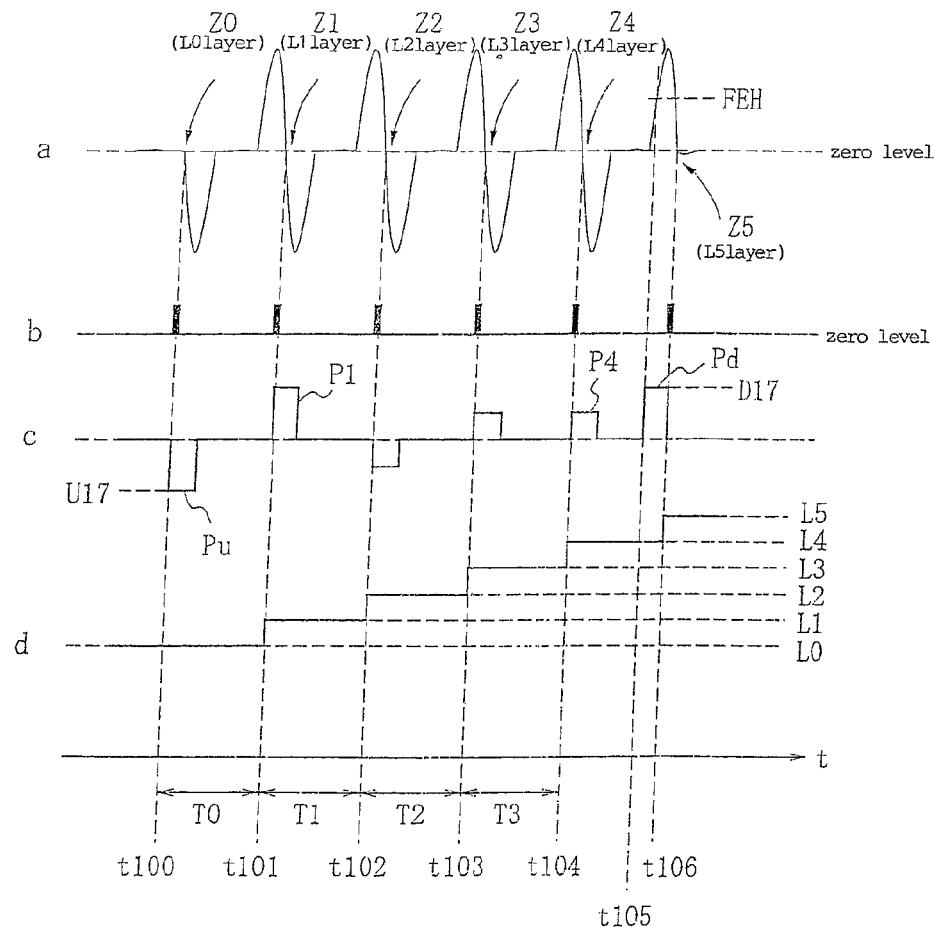
FIG. 8 is a diagram illustrating waveforms showing the FE signal, the signal applied to the focus actuator, and the position information of the focal point while performing the interlayer movement according to the first embodiment of the present invention.
FIG. 9 is a diagram illustrating the layer number with relative to the position information of the focal point and the cover layer thickness in the first embodiment of the present invention.

In FIG. 8, a represents an output waveform of the multiplier circuit 116, b represents the output of the zero-cross detection circuit 117, c represents the output of the pulse generation circuit 123, and d represents the output value of the counter 12, respectively.

"t100" shown in FIG. 8 is a timing when the focus control is opened in the above-described step S200. That is, at this "t100", an acceleration pulse Pu is applied to the focus actuator as shown by c. In addition, the timer 121 is started.

At "t101", the focal point reaches L1 layer, and the timer 121 is stopped. The timer value then is T0. The timer 11 again starts an operation after it is once reset. The inter-layer distance between the L1 layer and the L0 layer is D0, and D0 is 17 um which is specified by the disc specifications. Therefore, the relative speed V0 between the information layer and the focus is Q0/T0. Besides, FIG. 8 shows a case where V0 is faster with relative to Vo, and accordingly, a pulse P1 in a decelerating direction is outputted. The wave height value of P1 is K*Vs. Concretely, Vs=V0−Vo.

In addition, the counter value of the counter 120 becomes 1 at the timing of t101. Initially, 0 is set to the counter value of the counter 120, and in a case of the interlayer movement from the L0 layer to L5 layer, it is operated as an up-counter. This counter value represents the position information P, i.e., L1 layer in case of 1 while L2 layer in case of 2. FIG. 9 shows the relation between the positional information P, the layer number, and the cover layer thickness Dp.

When the focal point reaches L4 layer at the timing of t104, the pulse P4 is applied to the focus actuator 107. Thereafter, the focal point further moves toward the L5 layer.

When the FE signal level becomes larger than FEH at t105, the above-described step S212 is carried out. That is, when the deceleration pulse Pd is applied to the actuator, and the application of the pulse is concluded at the timing of t106, the focus control is closed. The counter value of the counter 120 then becomes 5, and the position information P becomes L5 layer.

Figure 10:
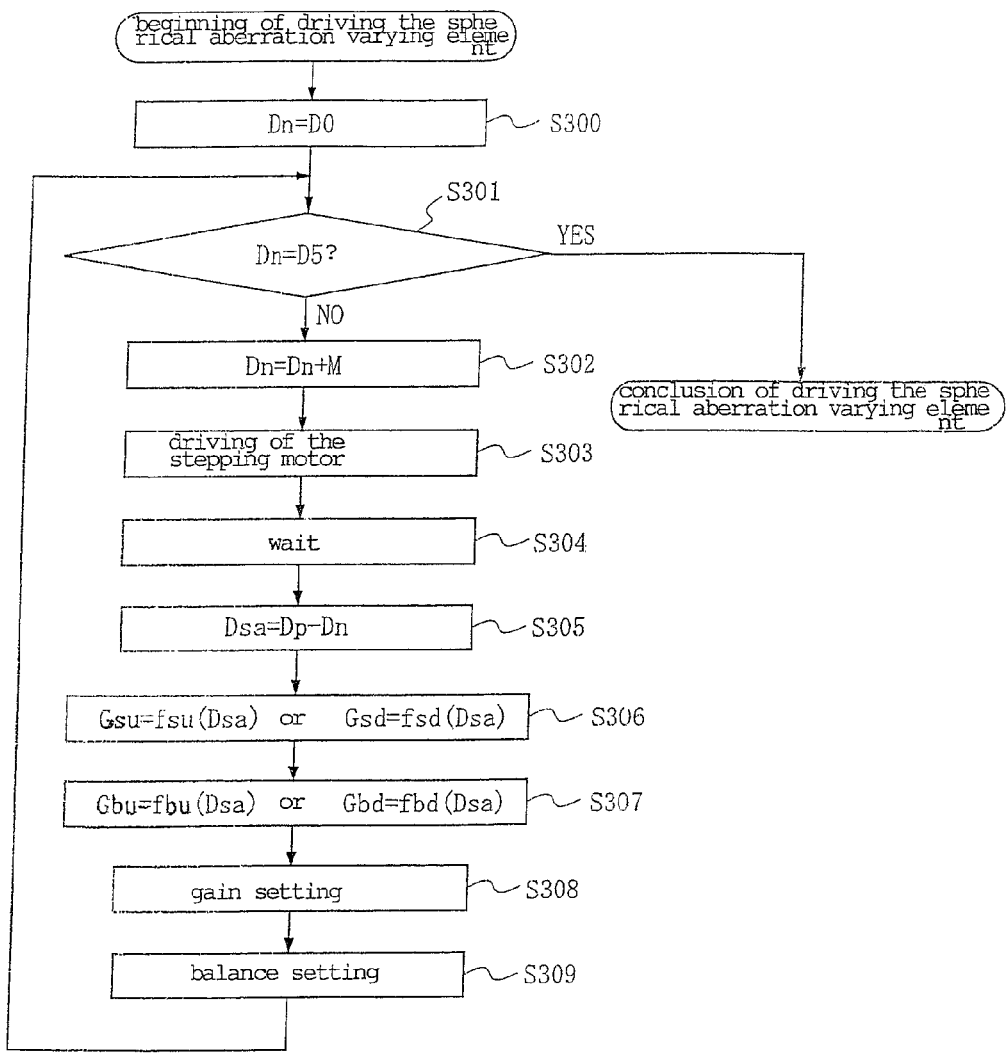
FIG. 10 is a diagram illustrating a flow of processing for displacing the spherical aberration varying element according to the first embodiment of the present invention.

Next, the control of the spherical aberration varying element 105 when the interlayer movement from the L0 layer to the L5 layer will be described with reference to the flowchart of FIG. 10.

Since the focal point is at L0 layer before starting the interlayer movement, the position of the spherical aberration varying element 105 is located at the position which corresponds to 116 um as the cover layer thickness of the L0 layer. That is, "116" is set to the driving circuit 125.

The microcomputer 127 first of all starts the driving such that the position of the spherical aberration varying element 105 is changed to the position where the spherical aberration becomes 0 at 40 um as the cover layer thickness of the L5 layer, but even when "40" is set to the driving circuit 125, the stepping motor 126 loses steps from the above-described characteristics of the stepping motor 126, thereby the spherical aberration varying element 105 cannot be displaced certainly. Accordingly, it is necessary to drive the stepping motor 126 along a predetermined speed profile.

At first, in step S300, since the focal point is at the L0 layer of the cover layer thickness 116 um, it is confirmed that Dn=116 is set in the driving circuit 125 of the stepping motor 126. Dn is a set value which is set to the driving circuit 125 of the stepping motor 126.

In step S301, it is judged as to whether the set value of the driving circuit 125 is Dn=D5 or not, that is, whether Dn=40 or not is judged. If the answer is negative, it proceeds to step S302, where an operation of Dn=Dn+M is carried out, and in the next step S303, the position of the spherical aberration varying element 105 is changed by M. M is the minimum forwarding unit of the stepping motor 126.

In step S304, it is waited until the stepping motor 126 responds, and in step S305, the difference between Dp corresponding to the above-described position information P and the position Dn of the spherical aberration varying element 105 is operated. The position information P is one showing at which layer the focal point performing the interlayer movement is located, and the difference between the cover layer thickness Dp of the layer corresponding to the position information P and the position Dn of the spherical aberration varying element 105 is proportional to the spherical aberration generation amount as shown in FIG. 9. That is, the degree of the distortion of the FE signal is determined on the basis of Dsa.

Next, in step S306, the ratio of the FE detection sensitivity is calculated. Here, since the case where Dsa≧0 corresponds to the case where the cover layer is thicker than the correction amount by the spherical aberration varying element 105, the ratio Gsu of the FE detection sensitivity is calculated using the above-described function fsu. On the other hand, since the case where Dsa<0 corresponds to the case where the cover layer is thinner than the correction amount by the spherical aberration varying element 105, the ratio Gsd of the FE detection sensitivity is calculated using the above-described function fsd.

Next, in step S307, the FE asymmetry variation amount Gbu is calculated. When Dsa≧0, the FE asymmetry variation amount Gbu is calculated using the above-described function fbd, while when Dsa<0, the FE asymmetry variation amount Gbd is calculated using the above-described function fbd.

Then, in step S308, a reverse number of Gsu, 1/Gsu, or a reverse number of Gsd, 1/Gsd, which GSu or Gsd is an operation result of the step S306 is set to terminal b of the multiplier 116 as a gain setting of the FE signal. Thereby, the reduction in the FE detection sensitivity caused by the distortion of the FE signal which arises due to the spherical aberration that corresponds to Dsa is corrected.

After the gain setting is performed in step S308, a value, –Gbu, a reverse polarity value of Gbu, or a value, –Gbd, a reverse polarity value of Gbd, which Gbu, or Gbd is an operation result of the step S307, is set to terminal c of the balance circuit 108 of FIG. 1 as a balance setting of the FE signal. Thereby, the FE symmetry that is caused by the distortion of the FE signal which is generated by the spherical aberration that corresponds to the distortion of the FE signal is corrected.

Thereafter, it returns to step S301, and the loop from the step S303 to the step S309 is repeated until the Dn becomes 40 which is a set value for the L5 layer, and when it is judged as Dn=D5 in step S301, the driving of the spherical aberration varying element 105 is concluded.

Besides, in the first embodiment, it is configured such that the inclination of the FE signal, i.e., the FE detection sensitivity is measured to correct the reduction in the FE detection sensitivity due to occurrence of the spherical aberration, the correction of the reduction of the FE detection sensitivity due to the occurrence of the spherical aberration may be carried out such that the amplitude of the FE signal measured is held constant. It is because the focal point position X0b at which the level of the FE signal shown in FIG. 3 becomes the FE0max and the focal point position X0a at which the level of the FE signal becomes the FE0min become approximately same even when the spherical aberration occurs, showing that the amplitude of the FE signal is approximately proportional to the inclination of the FE signal.

In addition, while in this first embodiment the interlayer movement from the L0 layer to the L5 layer is described, the interlayer movement from the L5 layer to the L0 layer can be carried out similarly to the interlayer movement from the L0 layer to the L5 layer. In addition, the interlayer movement from the L1 layer to the L4 layer can be similarly carried out using relational formulae of Gsd=fsd(R), Gbd=fbd(R), Gsu=fsu(R), and Gbu=fbu(R).

In addition, the response speed of the focus actuator 107 is faster with relative to the spherical aberration correction mechanism, and therefore, there arises a state where the spherical aberration correction element is not stabilized to the optimum value for the L5 layer at the timing when the focal point has moved to the L5 layer. However, the reproduction of information may start in this state, and if the reproduction of data is impossible due to that the spherical aberration varying element 105 is stabilized, a retry is performed. Since in the normal information reproduction, the reproduction becomes possible before the spherical aberration varying element 105 is stabilized, by performing reproduction of information at the above-described timing, the data transfer rate can be enhanced. In addition, when the recording of information is performed, in order to assure the quality of recording, the execution of recording is performed after the spherical aberration varying element 105 is stabilized.

As described above, according to the interlayer movement apparatus of the first embodiment, the time required for the focal point of laser moving between the layers is measured by detecting the zero-cross point of the focus error signal, the relative speed between the information layer of the optical disc and the focal point of the laser light is operated using the respective inter-layer distances which are specified by the disc specifications and the measured interlayer movement times, and the pulse amplitude of pulses for driving the focus actuator are determined on the operation result to drive the focus actuator to make the focal point of laser move. Thus, the speed control of the focus actuator can be carried precisely according to the interlayer distances between the respective layers when the focal point of the laser is to be moved from an information layer of a multi-layer disc to an information layer that is by two or more layers apart, thereby enabling performing a stable interlayer movement of laser light even when the inter-layer distances between respective layers are different.

In addition, since the inclination or asymmetry of the focus error signal in respective information layers when driving the focus actuator at starting the device are measured in the spherical aberration state of the objective information layer, the focus error signal is corrected according to the measured result, and the interlayer movement of the laser light is performed based on the corrected focus error signal, the interlayer movement of the laser light can be stably carried out even when the response of the spherical aberration varying element is slow with relative to the focus actuator.

In addition, by correcting the focus error signal, it is possible to prevent the reduction in the FE detection sensitivity thereby to maintain the symmetry of the focus error signal, and thereby the control when closing the focus control at the objective information layer can be made stable. Further, since it is possible to make the detection of the zero-cross of the focus error signal while performing the interlayer movement stably, the speed control of the focal point of the laser light can be made stable. Further, the timing for outputting the deceleration pulses before the objective information layer can be detected precisely, thereby enabling performing the interlayer movement of laser light precisely.

Besides, while the above-described interlayer movement of the focal point of laser light was that which make the focal point of the laser light by two or more layers (the interlayer movement which makes the focal point move by two or more layers is called as "first interlayer movement"), when the focal point of the laser light is made move from the L5 layer to L0 layer, there may be cases where collisions of the objective lens 106 to the surface of the optical disc 100 may occur due to faults in focus puling-in at the L0 layer or faulty counting of layers.

In view of the above, when making the focal point of laser light inter-layer move from the L5 layer to L0 layer, it may be configured comprising making the focal point of laser light move from the L5 layer to the L1 layer by a first interlayer movement, once closing the focus control at the L1 layer to wait for the spherical aberration varying element 105 being stabilized, and thereafter, making the focal point of the laser light move to the adjacent L0 layer.

Figure 11:
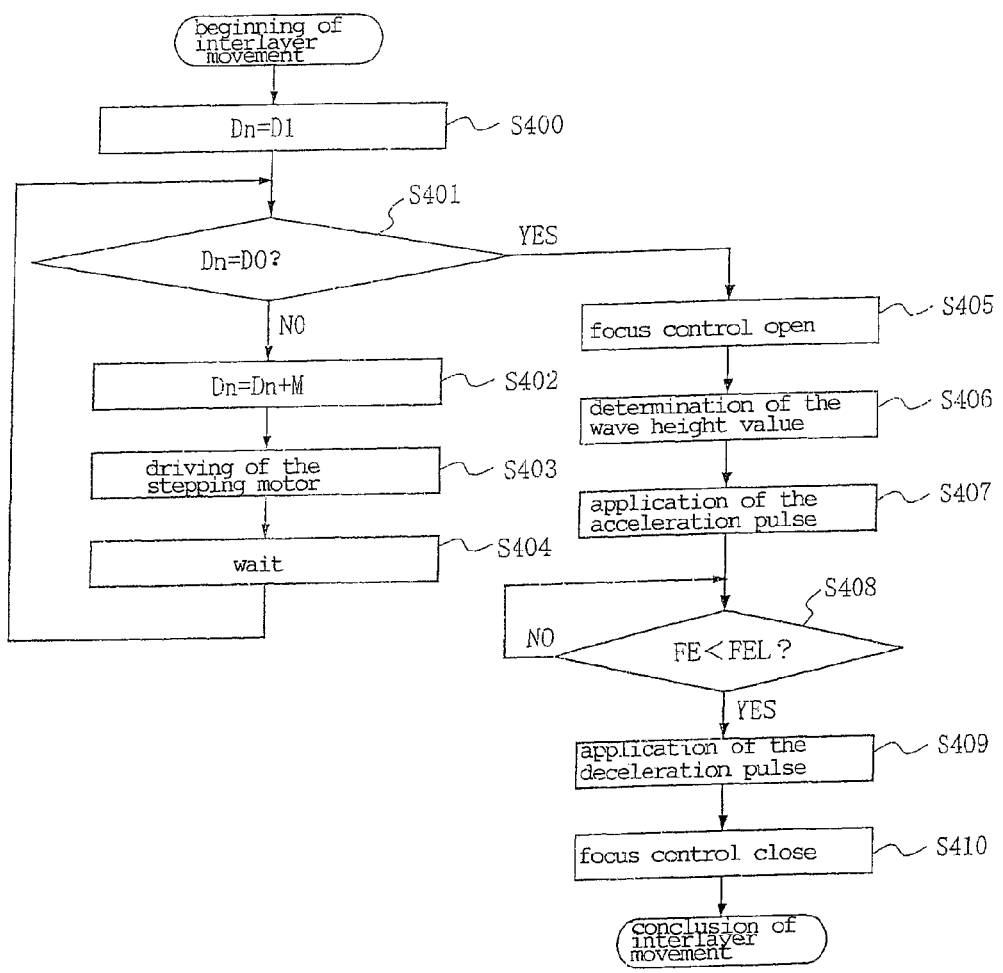
FIG. 11 is a diagram illustrating a flow of the second interlayer movement which carries out movement to the adjacent layer in the first embodiment of the present invention.

Hereinafter, a second interlayer movement which makes the focal point of laser light move to the adjacent layer will be described with reference to the flowchart of FIG. 11. FIG. 11 shows an operation where the focal point of laser light is moved from the L1 layer to the L0 layer.

At starting the second interlayer movement, since the focal position is located at the L1 layer, the driving value of the spherical aberration varying element 105 is at the position which corresponds to the cover layer thickness 99 um. That is, "99" is set to the driving circuit 125.

When the second interlayer movement is instructed, the microcomputer 127 drives the stepping motor 126 through the driving circuit 125 so that the position of the spherical aberration varying element 105 becomes the optimal value of the L0 layer.

At first, in step S401, it is judged on whether the set value of the driving circuit 125 is Dn=D0 or not, i.e., Dn=116 or not. If the answer is No, it proceeds to next step S402 where an operation of Dn=Dn+m is performed, and thereafter, in step S403, the position of the spherical aberration correction element 105 is changed by only M. M is the minimum forwarding unit of the stepping motor 126.

Then, in step S404, after it is waited until the stepping motor 126 responds, it returns to step S401, and up to that the position of spherical aberration varying element 105 is judged to have become the optimal value of the L0 layer, a loop from the step S401 to step S404 is repeated.

Figures 12, 13:
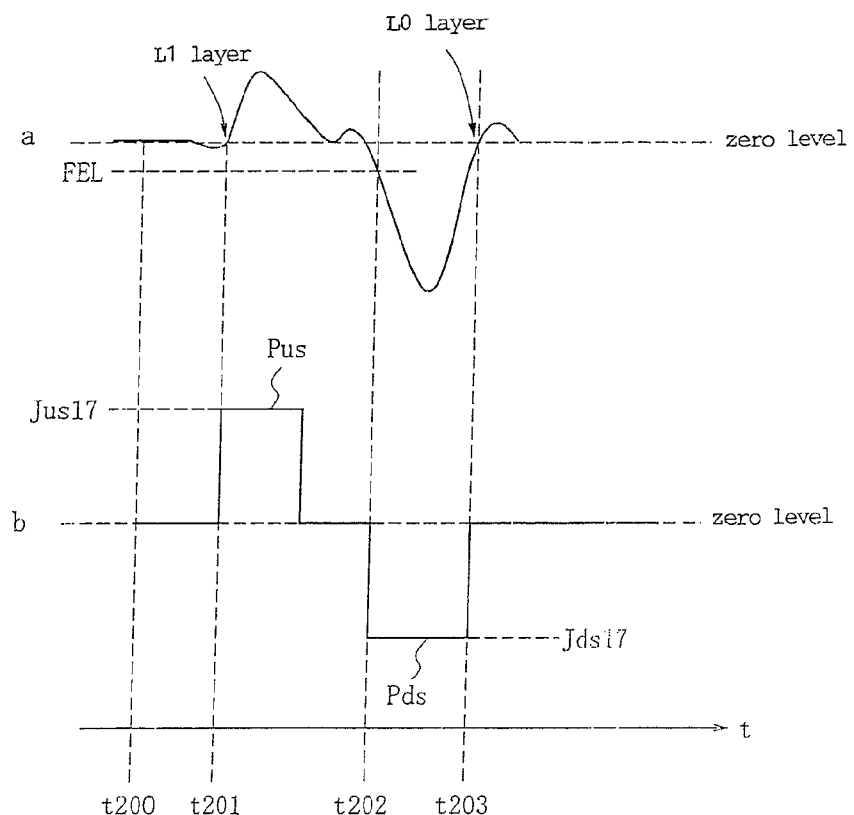
FIG. 12 is a diagram illustrating the acceleration pulse and the deceleration pulse in the second interlayer movement in the first embodiment of the present invention.
FIG. 13 is a diagram illustrating waveforms showing the FE signal and the signal applied to the focus actuator in the second interlayer movement in the first embodiment of the present invention.

When it is judged as Dn=D0 in step S401, it proceeds to step S405, and in step S405, the terminal a and terminal d of the switch 119 in FIG. 1 are opened to open the focus control. In step S406, the wave height values of the acceleration pulse and the deceleration pulse are selected from the table shown in FIG. 12 on the basis of the inter-layer distance. The table shown in FIG. 12 is one that is obtained from such as experiments from the optimum acceleration pulse height values and deceleration pulse height values with relative to the respective inter-layer distances which are specified by the disc specifications, and these are stored in a memory not shown. The inter-layer distance between the L1 layer and the L0 layer is specified as 17 um by the disc specifications and Jus17 and Jds17 as wave height values for the inter-layer distance 17 um are selected.

Thereafter, in step S407, an instruction is given to the pulse generator circuit 123, to generate an acceleration pulse Pus which makes the focal point move toward the L0 layer. The wave height value of this pulse Pus is Jus17.

In step S408, the microcomputer 127 judges as to whether the level of the FE level is smaller than a predetermined level FEL or not, and the timing at which FE<FEH is detected. When it is judged as FE<FEH in step S408, the deceleration pulse Pds is outputted in step S409.

Then, the microcomputer 127 connects terminal a and terminal d of the switch 19 in step S410 to close the focus control, thereby completing the second interlayer movement.

The above-described interlayer movement from the L1 layer to L0 layer will be described with reference to waveform diagram shown in FIG. 13.

In FIG. 13, a represents an output of the multiplier 116 and b represents an output of the pulse generation circuit 123.

At t200, the position of the spherical aberration varying element 105 is at an optimal position for the L1 layer. In other words, it is at the position corresponding to the cover layer thickness 99 um. At t200, the spherical aberration varying element 105 is started to be driven to the position optimal to the L0 layer. That is, a loop from step S401 to step S404 is repeated.

When the displacement of the spherical aberration varying element 105 is completed at t201, the focus control is opened, and the acceleration pulse Pus is applied to the focus actuator. When the FE signal is reduced to a value less than FEL at t202, the deceleration pulse Pds is applied to the focus actuator, and thereafter, the focus control is closed at t203, to complete the interlayer movement.

In this way, in the interlayer movement apparatus of this first embodiment, after the focal point of the laser light is moved from the L5 layer to L1 layer by the interlayer movement, the focus control is once closed, and the spherical aberration varying element 105 is displaced to the optimum value of the L0 layer in that state, and thereafter, a movement by a second interlayer movement to the L0 layer is carried out, thereby reducing the frequency that collisions of the objective lens 106 to the surface of the disc 100 should occur due to the faults in focus puling-in at the L0 layer or faulty counting of layers.

In addition, since the sensitivity and the symmetry of the FE signal at the L0 layer can be improved, the focus pulling-in at the L0 layer can be carried out stably, and thereby the interlayer movement of the focal point of the laser light can be carried out stably.

Second Embodiment

Figure 14:
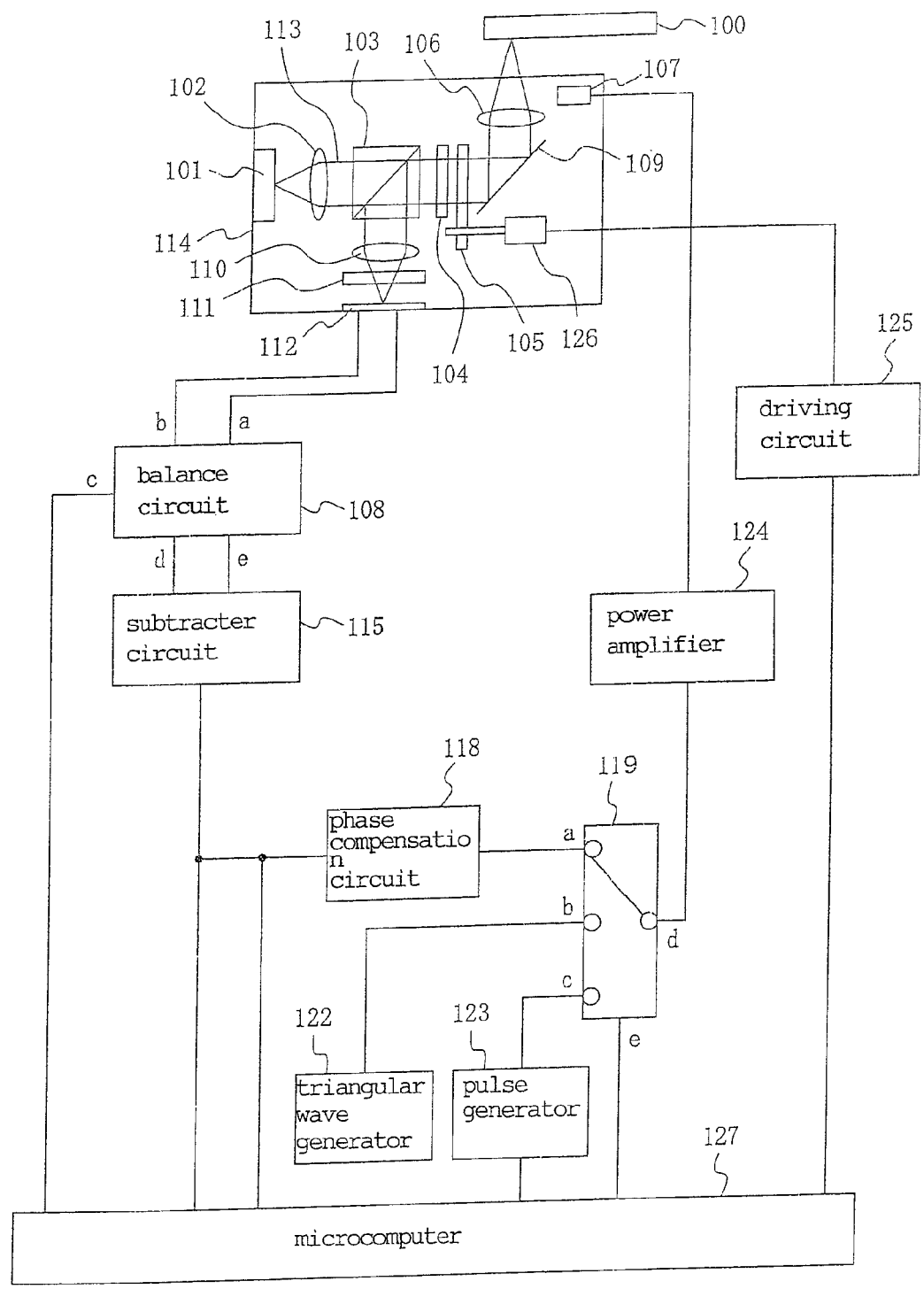
FIG. 14 is a block diagram illustrating an interlayer movement apparatus according to the second embodiment of the present invention.

FIG. 14 is a block diagram illustrating an interlayer movement apparatus according to a second embodiment of the present invention. In FIG. 14, the same reference numerals as in the first embodiment are assigned to the same constitutional elements.

The interlayer movement apparatus of this second embodiment is one which can realize, even when the symmetry of the FE signal is deviated due to changes with passage of time and the like, a stable interlayer movement with correcting the deviations.

The optical head 114 in this second embodiment is in a state where the photo detector 112 is deviated due to changes with passage of time and the like. Accordingly, irrespective that the spherical aberration varying element 105 is displaced to the optimal position for the L0 layer, the symmetry of the FE signal is deteriorated. This waveform is shown in waveform a of FIG. 16. When the symmetry of the FE signal is deteriorated, the asymmetry of the FE signal at the L1 layer where the spherical aberration has occurred is further deteriorated.

Hereinafter, an operation of correcting the FE signal in the interlayer movement apparatus of this second embodiment will be described.

Figure 15:
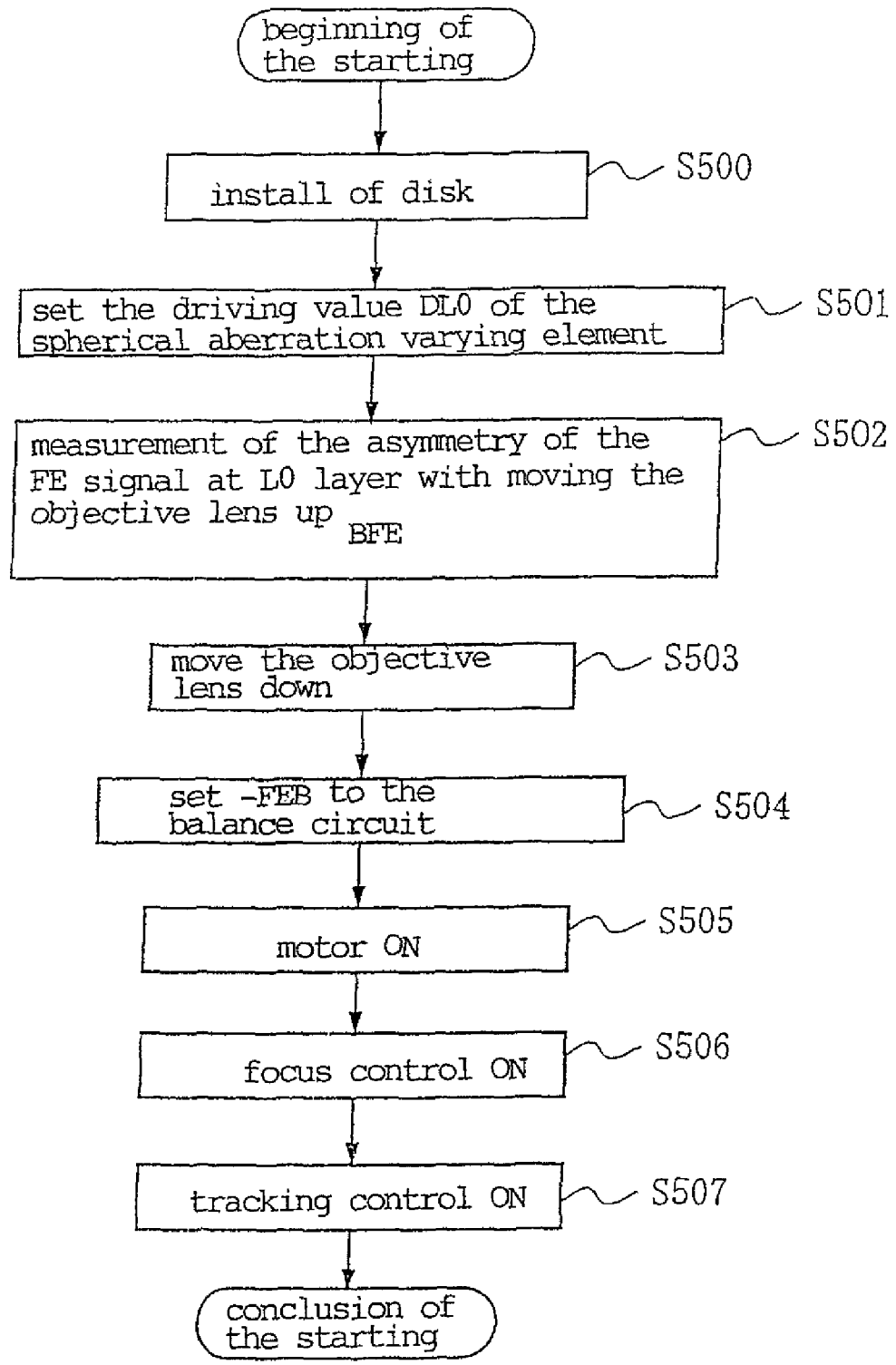
FIG. 15 is a diagram illustrating a flow of processing at starting of the interlayer movement apparatus according to the second embodiment of the present invention.

FIG. 15 is a flowchart showing processes from the optical disc 100 being installed to the reading out of information of the designated information layer being started.

At first, in step S500, the optical disc 100 is installed, and a reproduction instruction for reproducing a particular information layer of the optical disc 100 is given.

In step S501, the microcomputer 127 controls the stepping motor 126 to drive the spherical aberration varying element 105 through the driving circuit 125 so that the position of the spherical aberration varying element 105 is at D0.

In step S502, the microcomputer 127 connects terminal b and terminal d of the switch 119 to supply the output of the triangle wave generator 122 to the power amplifier 124. The power amplifier 124 outputs an output according to the inputted triangle wave to the focus coil of the focus actuator 107, thereby to move the objective lens 106 up and downwards in a direction vertical to the information layer of the optical disc 100 to perform a focus search operation.

Thereby, the relative distance between the objective lens 106 and the optical disc 100 varies, and at the output side of the subtracter 115, the FE signal which has six S shaped characteristics corresponding to the six information layers are outputted according to the output of the triangular wave. The waveform a shown in FIG. 16 shows the FE signal at the L0 layer and the L1 layer among the FE signal having these six S-shaped characteristics.

Then, the FE0max and the FE0min are measured, and the asymmetry BFE of the FE signal is operated using the following formula (13) to store the result in a memory means such as RAM of the microcomputer 127.

$$BEF0 = (FE0\text{max} + FE0\text{min})/(FE0\text{max} - FE0\text{min}) \quad \text{(formula 13)}$$

Next, at step S503, the objective lens 106 is once fallen down, and at step S504, −BFE0 is set to terminal c of the balance circuit 108.

At step S505, the microcomputer 127 makes the disc 100 rotate, and thereafter, at step S506, it turns on the focus control, and at step S507, it turns on the tracking control to conclude the starting of the device.

The waveform b shown in FIG. 16 is a waveform of the FE signal after—BFE0 is set to terminal c of the balance circuit 108 at step S504, i.e., the waveform after the symmetry of the FE signal is corrected. By correcting the FE signal in this way, the symmetry of the L0 layer is improved as well as the symmetry of the L1 layer is improved, thereby the interlayer movement is made stable.

Besides, while in the above the spherical aberration varying element 105 is displaced to the optimum position for the L0 layer to measure the asymmetry of the FE signal at the L0 layer, it may be configured such that the spherical aberration varying element 105 is displaced to the optimal position for the L1 layer to measure the asymmetry of the FE signal at the L0 layer. That is, the set value of the balance circuit 108 may be determined by measuring the asymmetry of the FE signal in the layer that is according to the position of the spherical aberration varying element 105.

As described above, according to a second embodiment of the present invention, the asymmetry of the focus error signal in the respective information layers in the spherical aberration state of the objective information layer at the starting of the device is measured, and the focus error signal is corrected according to the measures result, thereby even when the photo detector and the like are deviated according to changes in the temperature or with passage of time, the interlayer movement can be carried out stably.

APPLICABILITY IN INDUSTRY

The interlayer movement apparatus of the optical device according to the present invention is one which enables performing an interlayer movement stably even when the interlayer distances between respective layers are different due to the disc specifications and further performing interlayer movement stably even when the response of the spherical aberration varying element is slow, and is useful in an optical device that employs a multi-layer optical disc.

What is claimed is:

1. An interlayer movement apparatus for moving a focal point of a laser light between layers of an optical disc in an optical disc apparatus which performs recording and reproduction of data with irradiating the laser light onto the optical disc which has a plurality of information layers with interlayer distances between the respective information layers that are different due to the optical disc specifications, comprising:

an objective lens which collects the laser light from an optical source;
a focus actuator for moving the objective lens in its optical axis direction;

a focus error detection means for detecting a focus error signal which indicates a convergent state of the laser light on the information layer of the optical disc;

a focus control system for controlling the focus actuator so that the laser light on a predetermined information layer of the optical disc comes into a predetermined convergent state; and an interlayer movement control system operated to drive said focus actuator according to a relative speed between the information layer of the optical disc and the focal point which was calculated using the respective interlayer distances which are specified by the optical disc specifications and the time required for the focal point of the laser light passing through the respective layers which was measured on the basis of the focus error signal, thereby to perform one or both of a first interlayer movement that makes the focal point of the laser light interlayer-move to the information layer that is two or more layers apart and a second interlayer movement that makes the focal point of the laser light interlayer-move to an adjacent information layer, thereby to make the focal point of the laser light move to an objective information layer, wherein said interlayer movement control system is one which is operated, when moving the focal point of said laser light to the information layer of said optical disc that is most apart from said objective lens, after moving the focal point of said laser light to an information layer that is one prior to the objective information layer by said first interlayer movement, to once close the focus control by the focus control system, and thereafter, to make the focal point of the laser light move to the objective information layer.

2. An interlayer movement apparatus for moving a focal point of a laser light to an arbitrary layer of an optical disc in an optical disc apparatus which performs recording and reproduction of data with irradiating the laser light onto the optical disc which has a plurality of information layers, comprising:

an objective lens which collects the laser light from an optical source;

a spherical aberration varying means, provided on an optical path between the light source and the objective lens, for correcting the spherical aberration which occurs from said optical disc by varying the position where said spherical aberration varying means itself is located;

a focus actuator for moving the objective lens in its optical axis direction;

a focus error detection means for detecting a focus error signal which indicates a convergent state of the laser light on the information layer of the optical disc;

an interlayer movement control system operated to correct the symmetry of the focus error signal which was detected by the focus error detection means on the basis of the symmetry of the focus error signal in a predetermined information layer of the optical disc in a predetermined spherical aberration state, and to drive said focus actuator on the basis of the corrected focus error signal, thereby to make the focal point of said laser light move to the another information layer.

3. An interlayer movement apparatus as defined in claim 2, wherein, said interlayer movement control system is operated to previously drive, before performing recording or reproduction of data into/from said optical disc, said focus actuator so as to measure the symmetry of said focus error signal in the respective information layers of said optical disc in a predetermined spherical aberration state, and to correct the symmetry of the focus error signal according to the measured result.

4. An interlayer movement apparatus for moving a focal point of a laser light to an arbitrary layer of an optical disc in an optical disc apparatus which performs recording and reproduction of data with irradiating the laser light onto the optical disc which has a plurality of information layers, comprising:

an objective lens which collects the laser light from an optical source;

a spherical aberration varying means, provided on an optical path between the light source and the objective lens, for correcting the spherical aberration which occurs from said optical disc by varying the position where said spherical aberration varying means itself is located;

a focus actuator for moving the objective lens in its optical axis direction;

a focus error detection means for detecting a focus error signal which indicates a convergent state of the laser light on the information layer of the optical disc; and an interlayer movement control system operated to correct the focus error signal which was detected by the focus error detection means on the basis of the inclination of the focus error signal in a predetermined information layer of said optical disc in a predetermined spherical aberration state, and to drive said focus actuator on the basis of said corrected focus error signal, thereby to make the focal point of the laser light move to an objective information layer.

5. An interlayer movement apparatus as defined in claim 4, wherein said interlayer movement control system is operated to previously drive said focus actuator at a constant speed to measure the inclination of the focus error signal in the respective information layers of the optical disc in a predetermined spherical aberration state, and then to correct the focus error signal according to the measured inclination.

6. An interlayer movement apparatus as defined in claim 4, wherein said interlayer movement control system is operated to previously obtain the relation of the inclination of the focus error signal with the difference between the variation amount of the spherical aberration varying means and the focal point position of the laser light, and to correct the inclination of the focus error signal on the basis of the above-described relation while performing an interlayer movement of the laser light.

7. An interlayer movement apparatus as defined in claim 4, which apparatus is operated:

after the focal point of the laser light is moved to the objective information layer, to start the reproduction of information before the spherical aberration is stabilized to the spherical aberration correction value which corresponds to a value for the objective information layer.

8. An interlayer movement apparatus as defined in claim 4, which apparatus is operated:

after the focal point of the laser light is moved to the objective information layer, to start the reproduction of information before the spherical aberration is stabilized to a spherical aberration correction value which corresponds to a value for the objective information layer, and start the recording of information after the spherical aberration is stabilized to said spherical aberration correction value.

9. An interlayer movement apparatus for moving a focal point of a laser light to an arbitrary layer of an optical disc in an optical disc apparatus which performs recording and reproduction of data with irradiating the laser light onto the optical disc which has a plurality of information layers, comprising:

an objective lens which collects the laser light from an optical source;

a spherical aberration correcting means for correcting a spherical aberration which is occurred from said optical disc by being provided on an optical path between the light source and the objective lens and making its position varied;

a focus actuator for moving the objective lens in its optical axis direction;

a focus error detection means for detecting a focus error signal which indicates a convergent state of the laser light on the information layer of the optical disc; and an interlayer movement control system operated to correct the focus error signal which was detected by the focus error detection means on the basis of the amplitude of the focus error signal in a predetermined information layer of said optical disc in a predetermined spherical aberration state, and to drive said focus actuator on the basis of said corrected focus error signal, thereby to make the focal point of said laser light move to an objective information layer.

10. An interlayer movement apparatus as defined in claim 9, wherein said interlayer movement control system is operated to previously drive said focus actuator at a constant speed to measure the amplitude of the focus error signal in the respective information layers of said optical disc in a predetermined spherical aberration state, and then to correct the focus error signal according to the measured amplitude.

11. An interlayer movement apparatus as defined in claim 9, wherein said interlayer movement control system is operated to previously obtain the relation of the amplitude of the focus error signal with the difference between the variation amount of the spherical aberration varying means and the focal point of the laser light, and to correct the amplitude of the focus error signal on the basis of the above-described relation while performing an interlayer movement of the laser light.

12. An interlayer movement apparatus as defined in claim 9, which apparatus is operated:

after the focal point of the laser light is moved to the objective information layer, to start the reproduction of information before the spherical aberration is stabilized to the spherical aberration correction value which corresponds to a value for the objective information layer.

13. An interlayer movement apparatus as defined in claim 9, which apparatus is operated:

after the focal point of the laser light is moved to the objective information layer, to start the reproduction of information before the spherical aberration is stabilized to a spherical aberration correction value which corresponds to a value for the objective information layer, and start the recording of information after the spherical aberration is stabilized to said spherical aberration correction value.

14. An interlayer movement apparatus for moving a focal point of a laser light to an arbitrary layer of an optical disc in an optical disc apparatus which performs recording and reproduction of data with irradiating the laser light onto the optical disc which has a plurality of information layers, comprising:

an objective lens which collects the laser light from an optical source;

a spherical aberration varying means, provided on an optical path between the light source and the objective lens, for correcting a spherical aberration which occurs from said optical disc by varying the position where said spherical aberration varying means itself is located;

a focus actuator for moving the objective lens in its optical axis direction;

a focus error detection means for detecting a focus error signal which indicates a convergent state of the laser light on the information layer of the optical disc; and an interlayer movement control system operated to correct the focus error signal which was detected by the focus error detection means on the basis of the asymmetry of the focus error signal in a predetermined information layer of said optical disc in a predetermined spherical aberration state, and to drive said focus actuator on the basis of said corrected focus error signal, thereby to make the focal point of said laser light move to an objective information layer.

15. An interlayer movement apparatus as defined in claim 14, wherein said interlayer movement control system is operated to previously drive said focus actuator at a constant speed to measure the asymmetry of the focus error signal in the respective information layers of said optical disc in a predetermined spherical aberration state, and then to correct the focus error signal according to the measured asymmetry.

16. An interlayer movement apparatus as defined in claim 14, wherein said interlayer movement control system is operated to previously obtain the relation of the asymmetry of said focus error signal with the difference between the variation amount of said spherical aberration varying means and the focal point position of the laser light, and to correct the symmetry of the focus error signal on the basis of the above-described relation while performing an interlayer movement of the laser light.

17. An interlayer movement apparatus as defined in claim 14, which apparatus is operated:

after the focal point of the laser light is moved to the objective information layer, to start the reproduction of information before the spherical aberration is stabilized to the spherical aberration correction value which corresponds to a value for the objective information layer.

18. An interlayer movement apparatus as defined in claim 14, which apparatus is operated:

after the focal point of the laser light is moved to the objective information layer, to start the reproduction of information before the spherical aberration is stabilized to a spherical aberration correction value which corresponds to a value for the objective information layer, and start the recording of information after the spherical aberration is stabilized to said spherical aberration correction value.

19. An integrated circuit for an interlayer movement apparatus which, provided on an optical disc apparatus comprising an objective lens for collecting a laser light from a light source onto an information layer of an optical disc, a focus actuator for moving said objective lens in its optical axis direction, and a focus error detection means for detecting a focus error signal indicating the convergent state of laser light on said information layer of the optical disc, and a focus control system for controlling the focus actuator so that the laser light on a predetermined information layer of the optical disc comes into a predetermined convergent state, makes the focal point of laser light move between layers of the optical disc which has a plurality of information layers and has interlayer distances between the respective information layers which are different according to the optical disc specifications, which apparatus is operated:

to drive said focus actuator according to the relative speed between the information layer of said optical disc and the focal point which was calculated using the time that is required for the focal point of laser light passing through respective layers which was measured based on the focus error signal and the respective interlayer distances of the optical disc, so as to perform one or both of a first interlayer movement that makes the focal point of laser light perform interlayer movement to the information layer that is two or more layers apart and a second interlayer movement that makes the focal point of laser light perform interlayer movement to an adjacent information layer, thereby to make the focal point of laser light move to an objective information layer, wherein the apparatus is operated, when making the focal point of laser light move to the information layer of the optical disc that is most apart from said objective lens, to make the focal point of laser light move to an information layer that is one beforehand the objective information layer by said first interlayer movement, and then to once close the focus control by the focus control system, and thereafter, to make the focal point of laser light move to the objective information layer by the second interlayer movement.

20. An integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration that occurs from the optical disc, a focus actuator for moving said objective lens in its optical axis direction, and a focus error detection means for detecting a focus error signal indicating the convergent state of laser light on said information layer of the optical disc, makes the focal point of laser light move between layers of a multi-layer optical disc which has a plurality of information layers, which apparatus is operated:

to correct the focus error signal which was detected by the focus error detection means on the basis of the symmetry of the focus error signal in a predetermined information layer of said optical disc in a predetermined spherical aberration state, and to drive said focus actuator on the basis of the corrected focus error signal thereby to make the focal point of laser light move to another information layer.

21. An integrated circuit for an interlayer movement apparatus as defined in claim 20, wherein the apparatus is operated, before performing recording or reproduction of data into/from said optical disc, previously to drive said focus actuator to measure the symmetry of said focus error signal in the respective information layers of said optical disc in a predetermined spherical aberration state, and to correct the symmetry of the focus error signal according to the measured result.

22. An integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration which occurs from said optical disc by varying the position where said spherical aberration varying means itself is located, a focus actuator for moving said objective lens in its optical axis direction, and a focus error detection means for detecting the focus error signal indicating the convergent state of laser light on said information layer of the optical disc, makes the focal point of the laser light move between the layers of a multi-layer optical disc which has a plurality of information layers, which apparatus is operated:

to correct the focus error signal which was detected by the focus error detection means on the basis of the inclination of the focus error signal in a predetermined information layer of said optical disc in a predetermined spherical aberration state, and to drive said focus actuator on the basis of said corrected focus error signal, thereby to make the focal point of the laser light move to an objective information layer.

23. An integrated circuit for an interlayer movement apparatus as defined in claim 22, wherein the apparatus is operated to previously drive said focus actuator at a constant speed to measure the inclination of the focus error signal in the respective information layers of the optical disc in a predetermined spherical aberration state, and then to correct the focus error signal according to the measured inclination.

24. An integrated circuit for an interlayer movement apparatus as defined in claim 22, wherein the apparatus is operated to previously obtain the relation of the inclination of the focus error signal with the difference between the variation amount of the spherical aberration varying means and the focal point position of the laser light, and to correct the inclination of the focus error signal on the basis of the above-described relation while performing an interlayer movement of the laser light.

25. An integrated circuit for an interlayer movement apparatus as defined in claim 22, wherein after the focal point of the laser light is moved to the objective information layer, the reproduction of information is started before the spherical aberration is stabilized to the spherical aberration correction value which is a value corresponding to the objective information layer.

26. An integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration which occurs from said optical disc by varying the position where said spherical aberration varying means itself is located; a focus actuator for moving said objective lens in its optical axis direction, and a focus error detection means for detecting the convergent state of laser light on said information layer, makes the focal point of the laser light move between layers of an optical disc which has a plurality of information layers, which apparatus is operated:

to correct the symmetry of the focus error signal which was detected by the focus error detection means on the basis of the amplitude of the focus error signal in a predetermined information layer of said optical disc in a predetermined spherical aberration state, and to drive said focus actuator on the basis of said corrected focus error signal, to make the focal point of said laser light move to an objective information layer.

27. An integrated circuit for an interlayer movement apparatus as defined in claim 26, wherein
the apparatus is operated to previously drive said focus actuator at a constant speed to measure the amplitude of the focus error signal in the respective information layers of said optical disc in a predetermined spherical aberration state, and then to correct the focus error signal according to the measured amplitude.

28. An integrated circuit for an interlayer movement apparatus as defined in claim 26, wherein
the apparatus is operated to obtain the relation of the amplitude of the focus error signal with the difference between the variation amount of the spherical aberration varying means and the focal point of the laser light, and to correct the amplitude of the focus error signal on the basis of the above-described relation while performing an interlayer movement of the laser light.

29. An integrated circuit for an interlayer movement apparatus as defined in claim 26, wherein
after the focal point of the laser light is moved to the objective information layer, the reproduction of information is started before the spherical aberration is stabilized to the spherical aberration correction value which is a value corresponding to the objective information layer.

30. An integrated circuit for an interlayer movement apparatus which, provided on an optical disc device comprising an objective lens for collecting a laser light from a light source onto an information layer of an optical disc, a spherical aberration varying means, provided on an optical path between the light source and the objective lens, for correcting the spherical aberration which occurs from said optical disc by varying the position where said spherical aberration varying means itself is located, a focus actuator for moving said objective lens in the optical axis direction, and a focus error detection means for detecting the convergent state of laser light on said information layer, makes the focal point of the laser light move between layers of an optical disc which has a plurality of information layers, which apparatus is operated:
to correct the focus error signal which was detected by the focus error detection means on the basis of the asymmetry of the focus error signal in a predetermined information layer of said optical disc in a predetermined spherical aberration state, and to make the focal point of the laser light move to an objective information layer on the basis of the corrected focus error signal.

31. An integrated circuit for an interlayer movement apparatus as defined in claim 30, wherein
the apparatus is operated to previously drive said focus actuator at a constant speed to measure the asymmetry of the focus error signal in the respective information layers of said optical disc in a predetermined spherical aberration state, and then to correct the focus error signal according to the measured asymmetry.

32. An integrated circuit for an interlayer movement apparatus as defined in claim 30, wherein
the apparatus is operated to previously obtain the relation of the asymmetry of said focus error signal with the difference between the variation amount of said spherical aberration varying means and the focal point position of the laser light, and to correct the symmetry of the focus error signal on the basis of the above-described relation while performing an interlayer movement of the laser light.

33. An integrated circuit for an interlayer movement apparatus as defined in claim 30, wherein
after the focal point of the laser light is moved to the objective information layer, the reproduction of information is started before the spherical aberration is stabilized to the spherical aberration correction value which is a value corresponding to the objective information layer.

* * * * *